(12) United States Patent
Nimura

(10) Patent No.: US 6,937,936 B2
(45) Date of Patent: Aug. 30, 2005

(54) NAVIGATION SYSTEM

(75) Inventor: Mitsuhiro Nimura, Okazaki (JP)

(73) Assignee: Aisin Aw Co., Ltd., Anjo (JP)

( * ) Notice: Subject to any disclaimer, the term of this patent is extended or adjusted under 35 U.S.C. 154(b) by 51 days.

(21) Appl. No.: 10/420,818

(22) Filed: Apr. 23, 2003

(65) Prior Publication Data

US 2003/0220735 A1 Nov. 27, 2003

(30) Foreign Application Priority Data

Apr. 25, 2002 (JP) .................................... 2002-124115
Apr. 25, 2002 (JP) .................................... 2002-124646

(51) Int. Cl.⁷ ........................................... G06F 165/00
(52) U.S. Cl. .................... 701/208; 701/209; 701/212; 701/213
(58) Field of Search ............................. 701/200–213; 340/990–995.1; 342/357.01–357.17; 707/100–102, 104.1, 4

(56) References Cited

U.S. PATENT DOCUMENTS 6,112,200 A * 8/2000 Livshutz et al. ............... 707/4
6,122,593 A * 9/2000 Friederich et al. .......... 701/202
6,163,749 A * 12/2000 McDonough et al. ....... 701/208
6,184,823 B1 * 2/2001 Smith et al. ........... 342/357.13
6,249,742 B1 * 6/2001 Friederich et al. .......... 701/202
6,308,177 B1 * 10/2001 Israni et al. ................. 707/100
6,473,770 B1 * 10/2002 Livshutz et al. ........ 707/103 R

* cited by examiner

Primary Examiner—Richard M. Camby
(74) Attorney, Agent, or Firm—Oliff & Berridge, PLC

(57) ABSTRACT

The map data may be updated on a specified area basis. This may shorten the time for updating the map data as well as lowers the cost of map data update. A navigation system comprising a data center 51 for distributing map data about a designated area upon receipt of a data-distribution request; an on-board device 14 having a data storage that stores map data, for updating the map data about the designated area with new map data distributed from the data center; and wherein the map data distributed from the data center has a layered structure in which the map data in a lowest-layer represents the designated area while the map data in a higher-layer represents a wider area that includes a smaller area represented by a lower-layer map data.

10 Claims, 18 Drawing Sheets

NAVIGATION SYSTEM

INCORPORATION BY REFERENCE

The disclosure of Japanese Patent Application No. 2002-124115 filed Apr. 25, 2002 including specification, drawings and claims is incorporated herein by reference in its entirety.

BACKGROUND OF THE INVENTION

1. Field of Invention

The invention relates to a navigation system.

2. Description of Related Art

So far, conventional navigation apparatus boarded on a vehicle such as an automobile have been provided. In the conventional navigation apparatus, the following operations are carried out. An operator, such as a driver, operates an input unit to select a destination; a present position of the vehicle is detected by a present position detection processing unit; then, based on such selected destination and the detected present position, a route from the present position to the selected destination is searched and route guidance is given to the operator. This route guidance helps the operator to drive the vehicle along the searched route.

The conventional navigation apparatus search a route by processing map data containing search data and road data stored on a storage medium like a CD-ROM or a DVD-ROM. Based on such map data, a base map is drawn on a screen in a display unit and the searched route is superimposed onto that map. Thereby, the route guidance is visually given to the operator. Alternatively, such route guidance is given audibly at each intersection.

Further, in the conventional navigation apparatus, various facilities, for example a restaurant, a hotel, and so on, are retrieved by processing the map data. When the facility is retrieved, information about the retrieved facility is displayed on the screen and the position of the retrieved facility is specified at the same time. If the operator selects the retrieved facility as a destination, the navigation apparatus automatically search a route to that retrieved facility.

Accordingly, the conventional navigation apparatus enable the operator to readily find a route to his/her desired destination or facility, allowing the operator to spot the present position of the vehicle on the searched route as well as to be certainly informed of the information about the retrieved facility. That is, the conventional navigation apparatus help the operator to travel the route to the destination or the facility with no difficulty or effort.

SUMMARY OF THE INVENTION

However, the operator using a conventional navigation apparatus has been faced with one problem. The route search is totally and exclusively based on the map data stored on the storage medium. That is, when new roads are opened, the operator has trouble searching a route because the map data, having been previously stored on the storage medium, has no information about such newly opened road. Likewise, when a new facility is constructed, the newly constructed facility is not retrieved because information about that facility is not covered by the map data previously stored on the storage medium. Further, another problem arises in searching a route when existing facilities are torn down. A conventional navigation apparatus would display a route to the torn down facility or display the information about such a torn down facility as far as information about the torn down facility remains in the map data. This is problematic to the operator because he or she is informed of wrong information.

Additionally, in the conventional navigation apparatus, the operator cannot designate a specific area for which he/she wants to update the map data in spite of the fact that the map data update is available at cost to the operator. In most cases, the operator wants to search or retrieve a route or a facility located within a specific area that includes his or her place of residence. However, according to the conventional navigation apparatus, the operator is forced to pay and update map data about, for example, a nationwide area that is wider than he expects or requires. In other words, the operator has to pay for the map data about the area for which the map data is unneeded. This puts an economic burden upon the operator.

For solving the above problems particular to conventional navigation apparatus, the invention provides a new navigation apparatus by which the map data stored on the storage medium may be updated through communication means with the latest-version map data. Thereby, the map data may be updated as needed, allowing the navigation apparatus to correctly search a route or retrieve a facility even in the case of a new road being opened, a new facility being constructed, or an existing facility being torn down.

However, a problem may arise with this feature of the new navigation apparatus. The amount of the map data becomes very large in order to provide route search accuracy. Therefore, when the operator tries to update the map data about, for example, a complete map of Japan, the time necessary to communicate with the data center drags on for a long period of time.

For solving the time problem peculiar to updating via a communication means, the invention provides a new navigation system in which the operator can update map data about only the area he/she designates, and thereby both the data-transmission time and the payment for the map data update are minimized.

In order to solve the above problems, a navigation system according to the invention comprises a data center for distributing map data about a designated area upon receipt of a data-distribution request and an on-board device having a data storage of map data, for updating the map data about the designated area with new map data distributed from the data center, wherein the map data distributed from the data center has a layered structure in which the map data in a lowest-layer represents the designated area while the map data in a higher-layer represents a wider area that includes a smaller area represented by a lower-layer map data.

In another navigation system according to the invention, the data storage stores updated map data and pre-update map data together.

Still another navigation system according to the invention has an operator terminal whereby the data-distribution request is transmitted to the data center, and as a result the map data is downloaded from the data center to an external storage medium.

BRIEF DESCRIPTION OF THE DRAWINGS

The invention will be described with reference to the drawings, in which.

DETAILED DESCRIPTION OF PREFERRED EMBODIMENTS

Embodiments according to the invention will be described hereinafter in detail with reference to the accompanying drawings.

A first embodiment according to the invention will be described with reference to FIG. 1.

Figure 1:
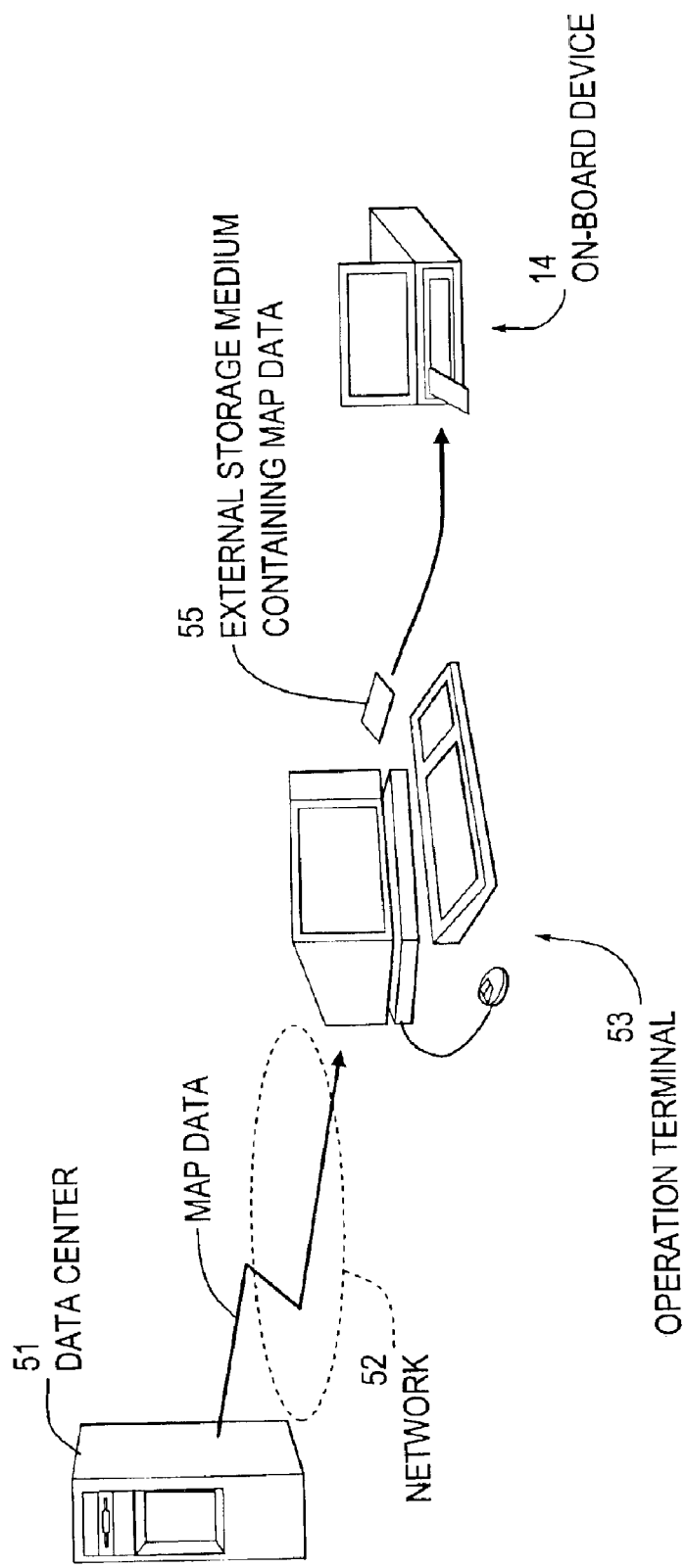
FIG. 1 is a representation of a navigation system according to a first embodiment of the invention.

In FIG. 1, an on-board device 14 working as a navigation apparatus mounted on a vehicle, such as an automobile, a truck, a bus, or a motorcycle, is a kind of computer comprising arithmetic means, such as a CPU or a MPU; storage means, such as a semiconductor memory or a magnetic disk; display means, such as a CRT, a liquid crystal display, or a LED (Light Emitting Diode) display; input means such as a keyboard, a joystick, a touch-sensitive panel, a push-button, a rotary-dial button, or a remote control; and an input-output interface. The on-board device 14 is not limited to a single computer, but may be a plurality of computers. Although a plurality of computers may be used in the present system, an on-board device 14 with a single computer will be described for simplicity. The on-board device 14 carries out route search as well as facility retrieval based on map data containing search data, road data, and the like stored on a storage medium, and thereby the searched route and retrieved facility are superimposed onto a map drawn on a screen in a display unit 35 (described hereinafter).

An operator terminal 53 operated by an operator, such as a driver, a fellow passenger of the vehicle, or an owner of the vehicle, is a kind of computer comprising arithmetic means, such as a CPU or a MPU; storage means, such as a semiconductor memory or a magnetic disk; display means, such as a CRT, a liquid crystal display, or a LED (Light Emitting Diode) display; input means, such as a keyboard, a joystick, a touch-sensitive panel, a push-button, a rotary-dial button, or a remote control; and a input-output interface. The operator terminal 53 may be any one of the following apparatuses: a personal computer, a portable telephone, a personal handy phone (which used in PHS: "Personal Handy-Phone System"), a stationary telephone, a PDA (Personal Digital Assistant), an electronic hand-held organizer, a handheld information terminal, a game machine, or a digital television. The operator terminal 53 can download operator's desired data to an external storage medium 55.

The external storage medium 55 may be a memory card or a stick memory that includes a semiconductor, such as a flash memory. As far as being removable and writable/readable, the external storage medium 55 may be any one of the following: a magnetic core, a semiconductor memory, a magnetic tape, a magnetic disk, a magnetic drum, a CD-R/RW, a MD (Mini Disk), a DVD-RAM, a DVD-R/RW, a MO (magneto-optical) disk, an IC card, an optical card, or any other existing or later developed removable and writeable/rewritable media. The data stored on the external storage medium 55 can be uploaded to the on-board device 14 via a data interface 18 (described hereinafter).

To establish communication, the operator terminal 53 is designed to connect with a data center 51 via a network 52. The data center 51 is a kind of computer comprising arithmetic means, such as a CPU or a MPU, storage means, such as a semiconductor memory or a magnetic disk, display means, such as a CRT, a liquid crystal display, or a LED (Light Emitting Diode) display, input means, such as a keyboard or a touch-sensitive panel, and a input-output interface. The data center 51 works as an information provision device like, for example, a Web server, a personal computer, a workstation, a distributed server, a general-purpose computer, or any other existing or later developed information provision device.

The network 52 may be a wire/wireless switched line network, a dedicated line network, the Internet, an intranet, a LAN (Local Area Network), a WAN (Wide Area Network) a wireless network, any other existing or later developed communication network, or a certain combined network comprised of the various networks. In this case, it is desirable that the network 52 should support a high-capacity high-speed transmission system. For example, if the network 52 is the Internet, a broadband network with data transfer rates in excess of some Mbps (Mega bit per second) is preferable. However, this high-capacity high-speed transmission system is not limited to the broadband network; any other existing or later developed high-capacity high-speed transmission system or method may be applicable to the invention.

According to the first embodiment, the on-board device 14 uses the map data distributed from the data center 51. In this case, the on-board device 14 works as a navigation apparatus to search a route based on the map data, containing the search data and the road data, stored on the memory medium. The searched route is mapped on the screen in the display unit 35. As a result, the route guidance may be given to the operator visually. Alternatively, such route guidance may be given to the operator audibly if the vehicle comes to intersections. Furthermore, the on-board device 14 can retrieve the various facilities, such as a restaurant, a hotel, and so on, based on the map data. When the facility is retrieved, information about the retrieved facility is displayed on the screen and the position of the retrieved facility is specified at the same time. If the operator selects the retrieved facility as a destination, the on-board device 14 automatically searches a route to that retrieved facility.

However, the route search operation may encounter difficulties when new roads are opened, because the map data for such newly opened road is not stored on the presently-used storage medium. Likewise, another problem comes up when a new facility is constructed. The newly constructed-facility is not retrieved because information about the facility is not stored in the map data on the presently-used storage medium. Further, another problem arises in searching a route when existing facilities are torn down or destroyed. In such case, there is a possibility that the navigation apparatus would display a route to the torn down facility or would display the information about such torn down facility because the information about the torn down facility remains in the map data. For solving these problems, the first embodiment of the invention provides the data center 51 that distributes the latest-version map data so as to update the map data stored on the storage medium placed in the on-board device 14. As a result, the map data may be updated as needed, allowing the navigation apparatus to search a route or retrieve a facility correctly even in the case of a new road being opened, a new facility being constructed, or an existing facility being torn down.

Further, according to the first embodiment of the invention, the data center 51 may distribute the latest-version map data that is split into pieces according to each area, for example, according to administrative divisions of Japan. Additionally, as needed, the latest-version map data may be split into pieces according to a narrower or wider area than the administrative divisions of Japan. For example, the map data about the Tokyo metropolitan area may be split up into two parts, East Tokyo and West Tokyo. By contrast, for example, each split map data about Ehime prefecture, Kagawa prefecture, Tokushima prefecture, and Kohchi prefecture may be gathered into one piece of map data about the Shikoku region.

The data center 51 distributes the map data about the operator's designated area to the operator terminal 53 upon receipt of a data-distribution request from the operator terminal 53. Not only the areas, but also map data versions, can be designated by the data-distribution request. After receiving the data-distribution request, with which the map data version is designated, the data center 51 then distributes the map data, in the designated version, to the operator terminal 53. This in-return distribution from the data center 51 to the operator terminal 53 may be carried out automatically when the latest-version map data is created and ready to be distributed by the data center 51.

When the latest-version map data is ready, the operator operates the operator terminal 53 to download such map data from the data center 51, via the network 52, onto the external storage medium 55. If the amount of the map data exceeds the total storage capacity of the external storage medium 55, the map data may be split into several pieces and each piece of data is downloaded to the external storage medium 55 separately. Subsequently, the external storage medium 55, storing the downloaded map data, is inserted into the on-board device 14. Upon insertion of the external storage medium 55, the latest-version map data is uploaded to the on-board device 14, and thereby the earlier-version map data having been stored in a data storage 16 (described hereinafter) is updated. Although the earlier-version map data is updated, it does not mean that it will be totally erased from the data storage 16. The earlier-version map data is intactly preserved in the data storage 16 together with the latest-version map data.

In a case where the on-board device 14 is connectable to the network 52 and allowed to have direct communication with the data center 51, the map data may be downloaded directly from the data center 51 to the on-board device 14. As a result, the map data may be updated as needed, allowing the navigation apparatus to search a route or retrieve a facility correctly in the case of a new road being opened, a new facility being constructed, or an existing facility being torn down.

Next, composition of the on-board device 14 will be described in detail with reference to the following accompanying drawings.

Figure 2:
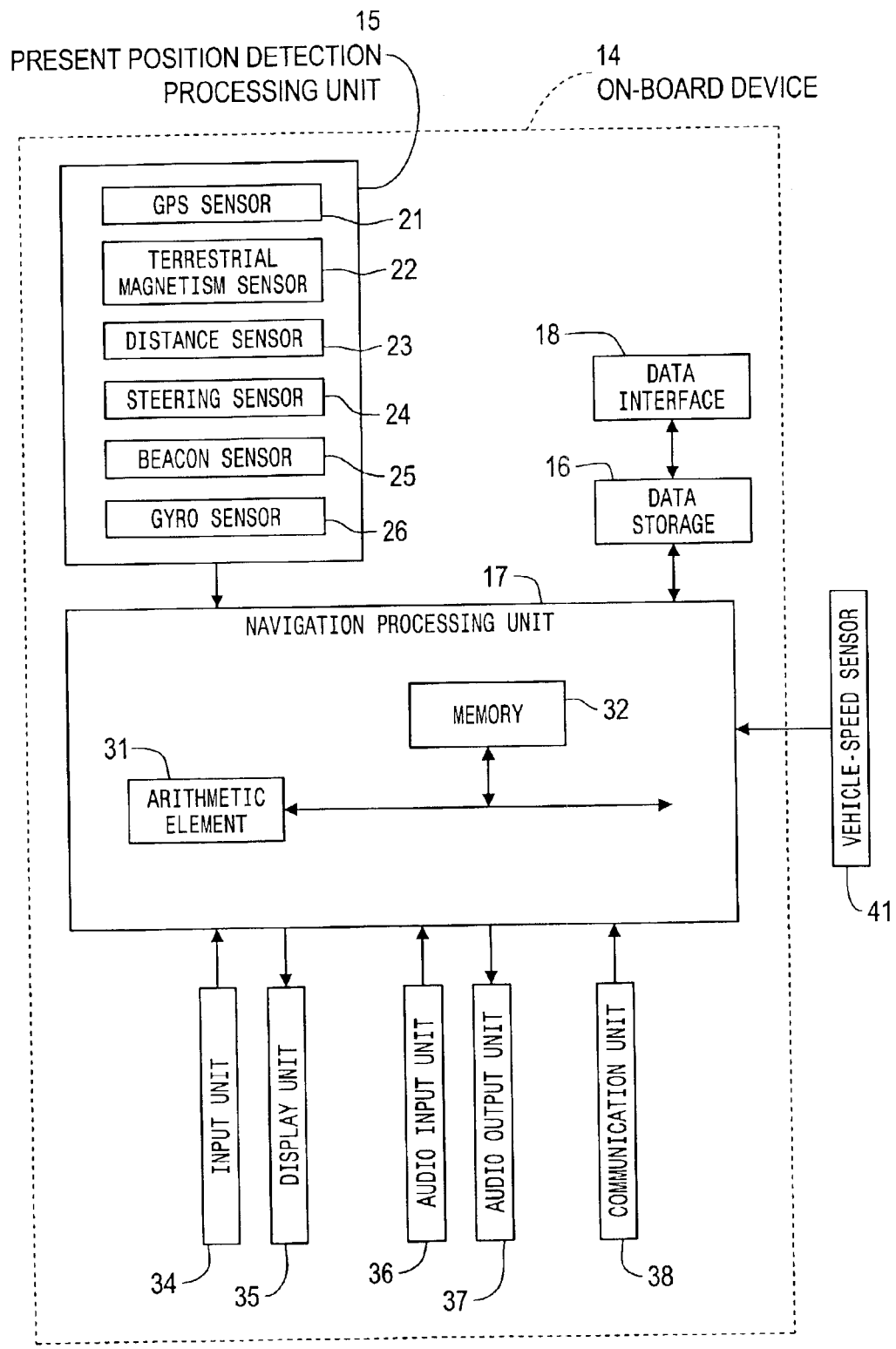
FIG. 2 is a schematic diagram of composition of an on-board device according to the first embodiment of the invention.
Figure 3:
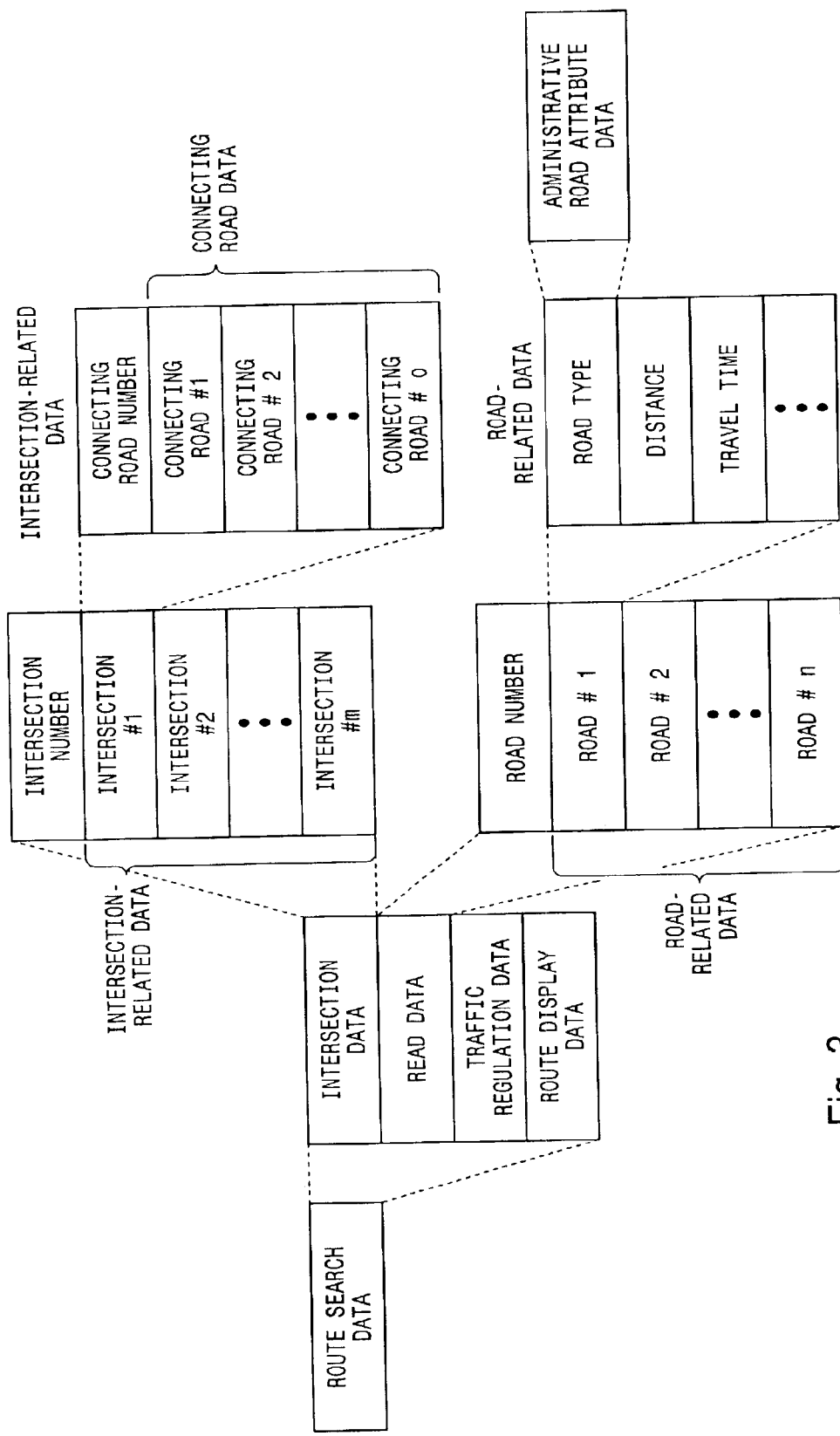
FIG. 3 is a conceptual block diagram of composition of route search data according to the first embodiment of the invention.
Figure 4:
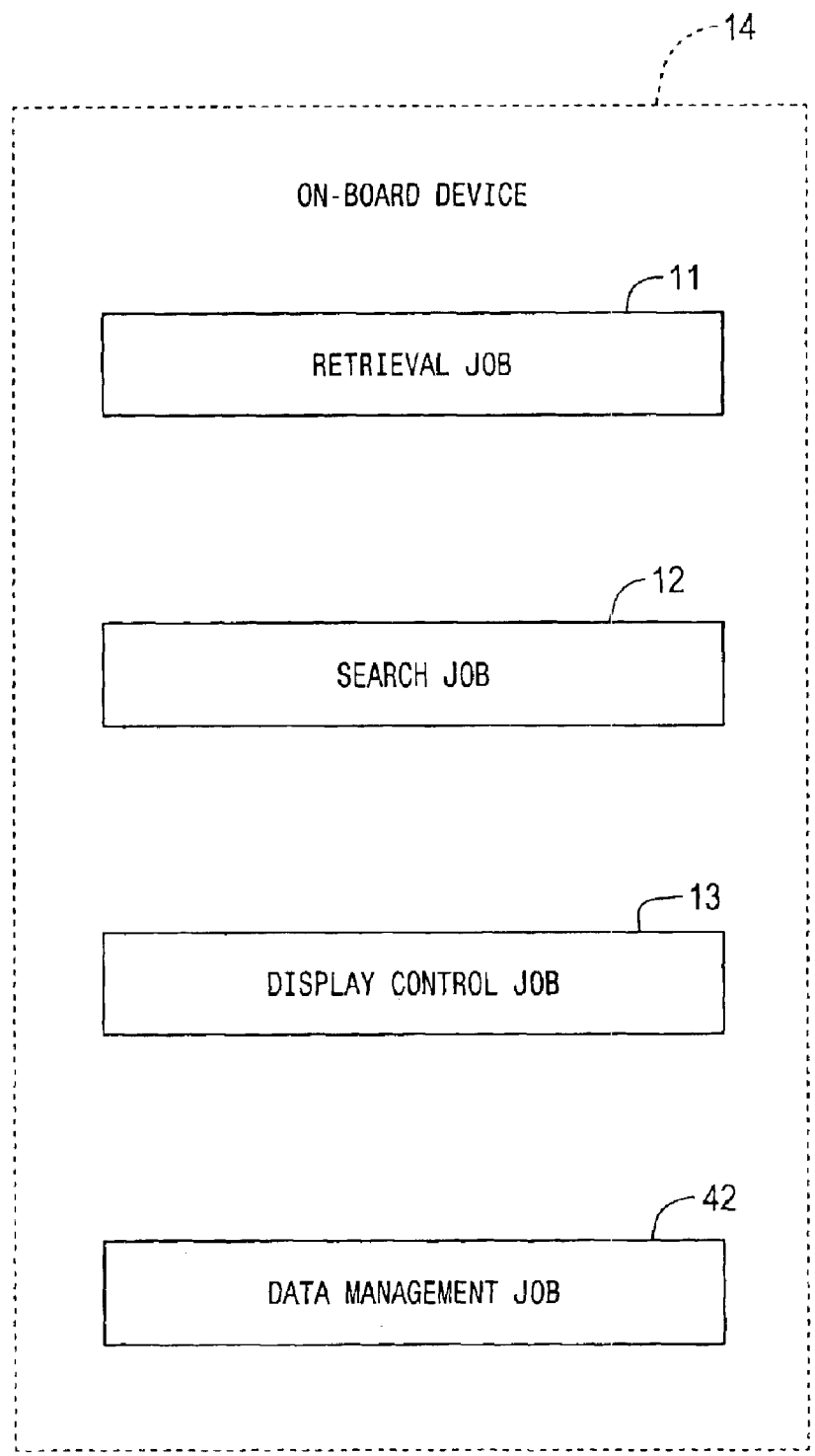
FIG. 4 explains functional jobs performed by the on-board device according to the first embodiment of the invention.

FIG. 2 is a schematic diagram of the composition of an on-board device 14 according to the first embodiment of the invention. FIG. 3 is a conceptual block diagram of the composition of route search data according to the first embodiment of the invention. FIG. 4 explains functional jobs performed by the on-board device 14 according to the first embodiment of the invention.

As shown in FIG. 2, the on-board device 14 comprises a present position detection processing unit 15, by which a present position of the vehicle is detected; a data storage 16, in which the map data including the road data, search data, and the like is stored; a navigation processing unit 17, by which every arithmetic process, such as a navigation processing, is carried out; a data interface 18, by which the data stored on the external storage medium 55 is read in; an input unit 34; a display unit 35; an audio input unit 36; an audio output unit 37; and communication unit 38. A vehicle-speed sensor 41 is coupled to the navigation processing unit 17.

The present position detection processing unit 15 comprises a GPS (Global Positioning System) sensor 21, a terrestrial magnetism sensor 22, a distance sensor 23, a steering sensor 24, a beacon sensor 25, a gyro sensor 26, and an altimeter (not shown). As one thinks proper, one or more of these components may be left out of the unit 15 in view of production costs.

The GPS sensor 21 detects a present position of the vehicle on the surface of the Earth by receiving radio waves generated by artificial satellites. The terrestrial magnetism sensor 22 detects vehicle bearings by measuring terrestrial magnetism. The distance sensor 23 detects a distance between one specific position and another position on a road. The distance sensor 23 may measure a rotational frequency of wheels, whereby a distance is detected. Alternatively, the distance sensor 23 may measure acceleration of the vehicle so as to detect a distance by integrating twice the measured acceleration.

The steering sensor 24 detects a steering angle. The steering sensor 24 may be any one of the following sensors fixed to a rotating-part of the wheels: an optical rotational sensor, a rotational resistance sensor, or an angle sensor.

The beacon sensor 25 detects the present position of the vehicle by receiving positional information from the beacons placed along roads. The gyro sensor 26 detects rotational angular speed (traverse angle) by using a gas-rate gyro or a vibrating gyro. Then, by integrating the detected rotational angular speed, the vehicle's bearing is detected.

Either the GPS sensor 21 or the beacon sensor 25 can independently detect the present position. In other circumstances, the present position may be detected with a combination of the distance and the vehicle's bearing which are respectively detected by the distance sensor 23 and by the terrestrial magnetism sensor 22 or the gyro sensor 26. Furthermore, the present position may be detected with a combination of the distance and the steering angle which are detected by the distance sensor 23 and the steering sensor 24, respectively.

The data storage 16 stores the map data comprised of various data types. The map data contains the following data types. Map display data is used in displaying a map on the screen in the display unit 35, carrying out map matching, and visually providing the operator with route guidance. Route guidance data represents intersection names used in the route guidance. Route search data contains various data for carrying out a route search. Retrieval data represents a facility inventory and building information, and is used in carrying out the facility retrieval based on a telephone number retrieval method, a Japanese-syllabic-basis retrieval method, and an adjacency retrieval method. Audio data contains fixed voices for vocal route guidance or vocal operator guidance as well as contains inherent voices used in outputting proper names such as intersection names or road names. Image data contains pictures or frame shots of intersections or routes. As one thinks proper, some of these data may be left out from the map data in view of production costs.

As shown in FIG. 3, the route search data contains intersection data, road data, traffic regulation data, and route display data. The intersection data contains both the number of the intersections and intersection-related data about details of each intersection. For every intersection-related data, an identifying number is given to identify each corresponding intersection. Further, the intersection-related data contains both the number of connecting roads and connecting road data. For every connecting road, an identifying number is given to identify each connecting road. As needed, the intersection data may include intersection type data that represents the type of the intersection. The intersection type is, for example, an intersection with traffic lights or an intersection without traffic lights.

The road data contains both the number of roads and road-related data about the details of each road. For every road-related data, an identifying number is given to identify each road. Further, the road-related data contains road type data, road distance (length) data, and travel time data. Furthermore, the road type data contains administrative road attribute data about administrative roads, i.e., national highways, prefectural highways, principal municipal roads, local roads, and expressways.

It is desirable that the road-related data contain data about the road itself, such as width, gradient, cants, elevation, banks, corners, road surface conditions, existence of a center divider (center strip or median), the number of traffic lanes, a point where the number of the traffic lanes is reduced, and a point where the width of the road is narrowed. In the case of expressways or arterial roads with up-lanes and down-lanes, such up-lanes and down-lanes are separately stored in the road-related data, and such expressways or arterial roads are judged as a two-way road. Specifically, the expressway, in which both the up-lane and the down-lane respectively have more than one lane, is judged as a two-way road. In this case, the up-lanes and the down-lanes are separately stored in the road-related data. As for the corners of the road, it is desirable that the road-related data should contain further detailed data as to a curvature radius of the corner, a corner of the intersection, a corner of T-square intersection, and an entrance to a corner. Further, the road-related data may contain the following road attributes: a railroad crossing, an expressway entrance or exit ramp, a tollgate, a climbing lane, and a descent lane.

Returning to FIG. 2, the navigation processing unit 17, comprising an arithmetic element 31, such as a CPU or MPU, and a memory 32, is a working memory when the arithmetic element 31 processes various data in addition to acting as a storage medium that stores various program data, such as a control program, a program for searching a route to the destination, a program for carrying out route guidance along a route, a program for determining a specific road segment, and a program for retrieving a point or a facility. In addition, the memory 32 stores a program for integrated control over the navigation processing part 17 or the on-board device 14, bitmap data about screen design for the display unit 35, and audio data for beep tones.

The navigation processing unit 17 is connected to the input unit 34, the display unit 35, the audio input unit 36, the audio output unit 37, and the communication unit 38. This composition enables various processes to be carried out, such as, route search, route guidance along routes, determination of a specific road segment, retrieval of a point or a facility. As one thinks proper, any one or more of the input unit 36, the output unit 37, and the communication unit 38 may be left out from the described composition in view of production costs.

Although the data storage 16 is described herein as a hard disk comprising either a single magnetic disk or plural magnetic disks, the storage 16 may be any type of storage device now known or later developed, insofar as the data stored therein can be updated. For example, the storage 16 may be any storage device that uses any of the following writable storage media: a magnetic core, a semiconductor memory, a magnetic tape, a magnetic disk, a magnetic drum, a CD-R/RW, a MD (Mini Disk), a DVD-RAM, a DVD-R/RW, a MO (magneto-optical) disk, an IC card, an optical card, a stick memory, a memory card, or any possible media. The storage medium as well as the storage device may be stationary or user-installable.

According to the first embodiment, the memory 32 stores the various programs and the data storage 16 stores the various data including the map data. As for the storage 16, the map data stored therein may be updated by reading out the latest-version map data stored in the external storage medium 55 via the data interface 18.

Various data are transmitted and received between the communication unit 38 and a transmission source, such as an FM transmitter, a telephone network, the Internet, or a portable telephone network. For example, the communication unit 38 receives the following data via the communication means: road information about traffic congestion collected by a certain information sensor (not shown), traffic accidents information, and/or D-GPS information to find an error in detection by the GPS sensor 21. If needed, the communication unit 38 may make a direct connection to the network 52. In such a case, the map data may be directly downloaded from the data center 51 to the on-board device 14 via network 52.

The input unit 34 comprises an operation key, a push-button, a rotary-dial button, or a cross-key which is located on the body of the on-board device 14. Alternatively, the input unit 34 may be a remote control. With the operation of the keys or buttons, a position on departure is calibrated as well as a facility and/or destination is inputted. If the display unit 35 is a touch-sensitive panel, it is desirable that the input unit 34 should take a displayable form comprising operation switches, such as an operation key or operation menus.

Onto the screen in the display unit 35, the operator guidance, the operation menus, operation key explanation, a route from a present position to the destination, and guidance information along the route are displayed. The display unit 35 may be, for example, a CRT display, a liquid crystal display, a LED (Light Emitting Diode) display, a plasma display, or a hologram device that projects a hologram onto a windshield of the vehicle.

The audio input unit 36, from which necessary information is inputted by voice, comprises, among other things, a microphone (not shown). Further, the audio output unit 37 is comprised of, among other things, a voice synthesizer and a speaker (both not shown), and outputs synthesized audio information from the speaker to the operator. Here, the synthesized audio information is, for example, guidance information or speed-change information. In addition to the synthesized audio information, various sounds and the guidance information recorded on a tape or a memory may be outputted from the speaker.

According to the first embodiment, the on-board device 14 may perform the following jobs, as shown in FIG. 4: a retrieval job 11, a search job 12, a display control job 13, and a data management job 14. In the retrieval job 11, a facility, such as a hotel, a department, a railway station, or a building, as well as a point, such as a sightseeing spot, a noted place, or a point of historic interest, are retrieved. These facilities are hereinafter generically referred to as "facility." In the search job 12, a route from a departure point or a present position to a destination or a pass-through point is searched. In the display control job 13, the display unit 35 is controlled in order that a map, a route, and a facility may be displayed in a predetermined style. We will discuss the details about the data management job 14 later.

Specifically, the retrieval job 11 involves facility retrieval based on the map data being stored in the storage 16, wherein the facility is retrieved according to a common retrieval method employed in a conventional navigation apparatus. The search job 12 involves the route search according to an ordinary route search method employed in a conventional navigation apparatus. In the search job 12, when the destination is selected, the route search data shown in FIG. 3 is accessed and, with the route search data, a route from the present position to the selected destination is searched. Because the map data, including the route search data, has a layered structure, the route search in the search job 12 is carried out by processing such layered map data. The display control job 13 involves display control, whereby one area, depicted based on the updated map data, and another area, depicted based on the pre-update map data, are displayed in a manner that the operator can distinguish one from the other.

Hereinafter, operations carried out by the navigation system with the described composition will be described with reference to FIG. 5. First, the description centers on a route search by the on-board device 14.

Figure 5:
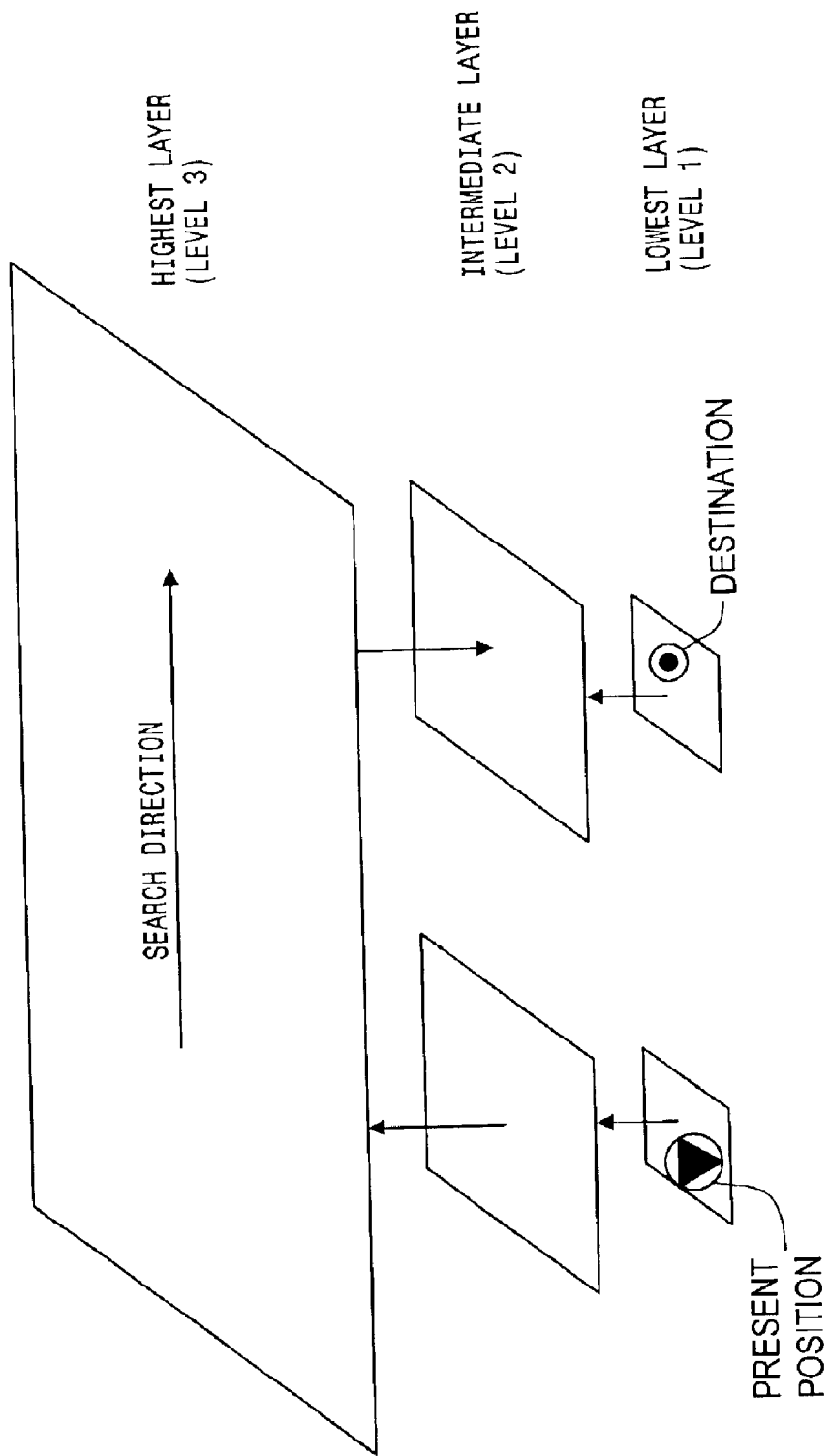
FIG. 5 explains route search based on layered map data according to the first embodiment of the invention.

FIG. 5 explains a route search based on layered map data according to the first embodiment of the invention.

As an example, description will be provided of scenarios in which the on-board device 14 searches a route from a present position of the vehicle to a destination selected by the operator. In this case, the map data has a three-level layer as shown in FIG. 5. A highest level of the layer (a highest-layer or Level 3 layer) is comprised of one highest-layer block that stores a nationwide arterial road network comprising the expressways and the principal national highways. An intermediate level of the layer (an intermediate-layer or Level 2 layer) is comprised of plural intermediate-layer blocks which respectively cover specified areas. Each intermediated-layer block stores a fundamental road network comprising the expressways, the national highways, and the principal municipal roads located within a specified area, for example, a ninety-square-kilometer area. A lowest level of the layer (a lowest-layer or Level 1) is comprised of plural lowest-layer blocks which respectively cover sub-specified areas. Each lowest-layer block stores a specific road network comprising the expressways, national highways, prefectural highways, the principal municipal roads, and narrow roads located within a sub-specified area, for example, an eighteen-square-kilometer area.

According to the first embodiment, the lower-layer blocks, which cover narrow areas, contain specific data while higher-layer blocks, which cover wide areas, contain general data. For example, the lowest-layer block, the Level 1 layer, contains road data of every kind of road, including the narrowest roads located within municipality level areas (cities, towns, and villages). The highest-level block, the Level 3 layer, contains road data about the national highways and the roads greater than that national highways located on a nationwide scale. In the first embodiment, the level of the block, i.e., the size of the block or the area covered by the block may be defined at the operator's discretion. Further, it is possible for the operator to define the number of the layers (layer levels). Here, in the first embodiment, the three-layered map data is taken as an example for ease of explanation.

Regarding the route search operation, for ease of explanation, description will be made of a scenario in which a short-distance route (for example, a three-kilometer route to the destination) is searched. In such a case, the route search is carried out using only the lowest-layer block that covers a surrounding area closest to the present position of the vehicle. In the case of a middle-distance route search (for example, a fifty-kilometer route to the destination), the route search is carried out using three blocks, the lowest-layer block covering the surrounding area closest to the present position, the lowest-layer block covering the surrounding area closest to the destination, and the intermediate-layer block covering the area which includes both the present position and the destination. Further, in the case of a long-distance route search (for example, a three hundred-kilometer route to the destination), the route search is carried out using five blocks: two lowest-layer blocks covering the surrounding area closest to the present position and the destination, two intermediate-layer blocks covering the surrounding area closer to the present position and to the destination, and the highest-layer block that covers the area including both the present position and the destination. Thereby, the amount of the map data used in the route search is reduced enough to shorten the time for searching a route.

When searching a route, the road data contained in the route search data is referred to in order to calculate the search cost for each road located within the area covered by the block. Here, the search cost means a weight given to each road to be subjected to the route search operation. In the first embodiment, a weight is given to a road in view of the following factors: a road type, a toll road or an expressway, length of the road, travel time, width of the road, and right turn or left turn. For example, if the search cost is calculated based on the length of the road, a route that minimizes the total length of the roads to the destination is determined as a distance-optimal route. Further, for example, if the search cost is calculated based on the travel time to the destination, a route that minimizes the total travel time to the destination is determined as a time-optimal route.

Next, operations for map data update will be described with reference to the following accompanying drawings.

Figure 6:
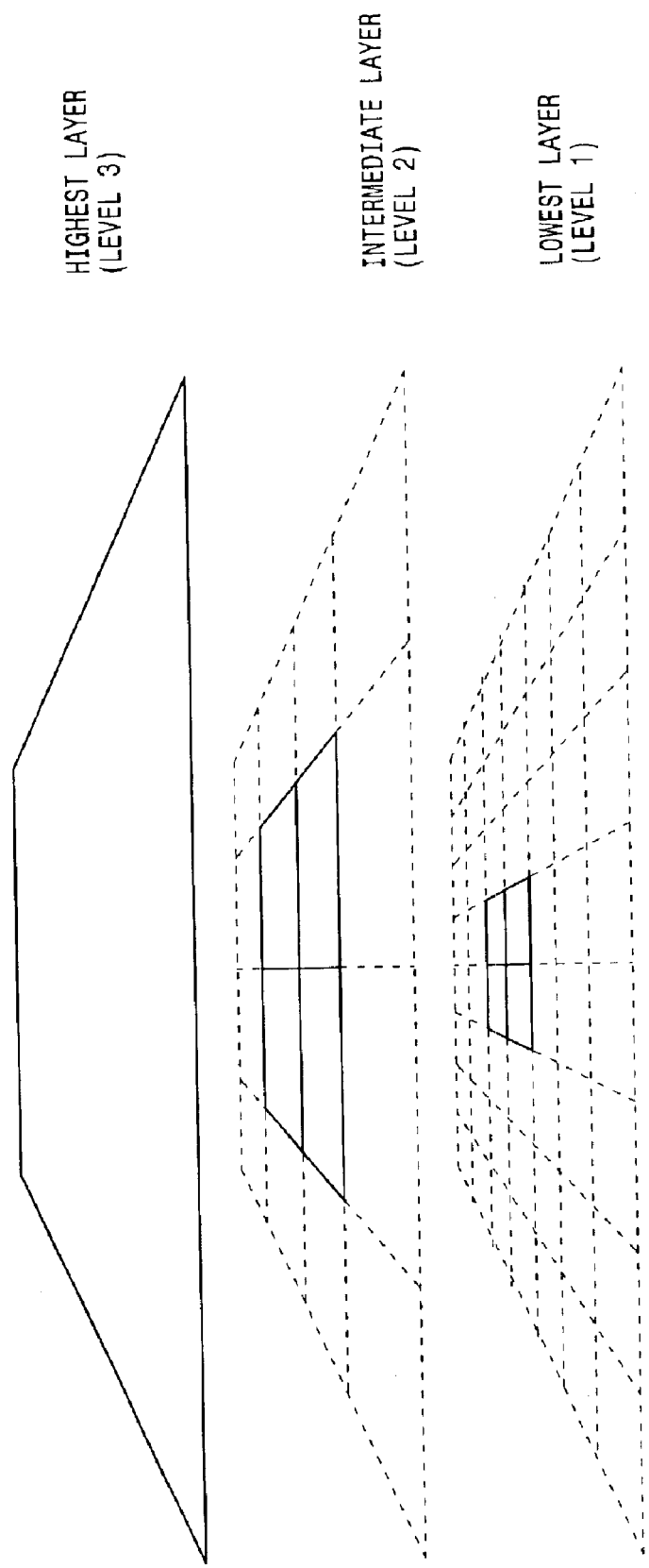
FIG. 6 explains layered map data distributed from a data center according to the first embodiment of the invention.
Figure 7:
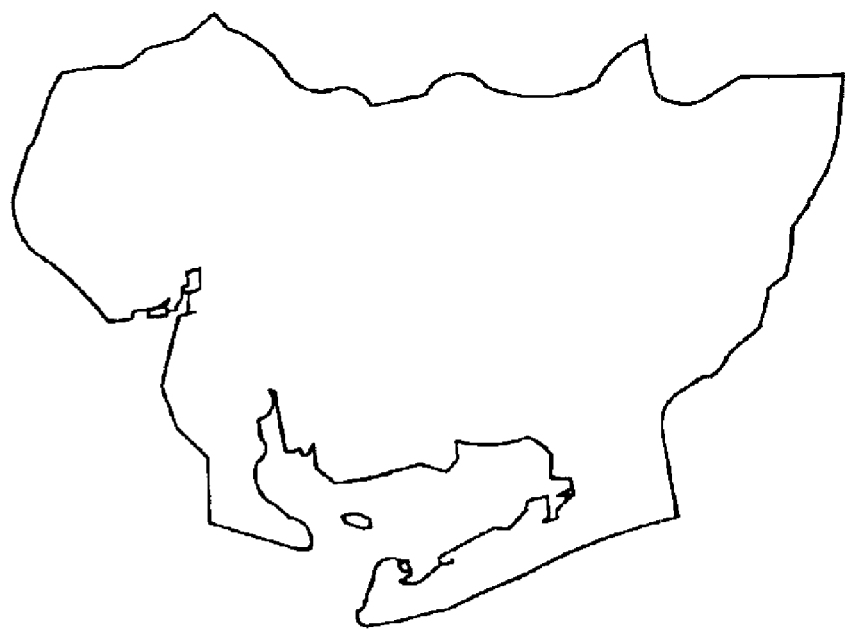
FIG. 7 shows an example of lowest layer map data distributed from the data center according to the first embodiment of the invention.
Figure 8:
FIG. 8 shows an example of intermediate layer map data distributed from the data center according to the first embodiment of the invention.
Figure 9:
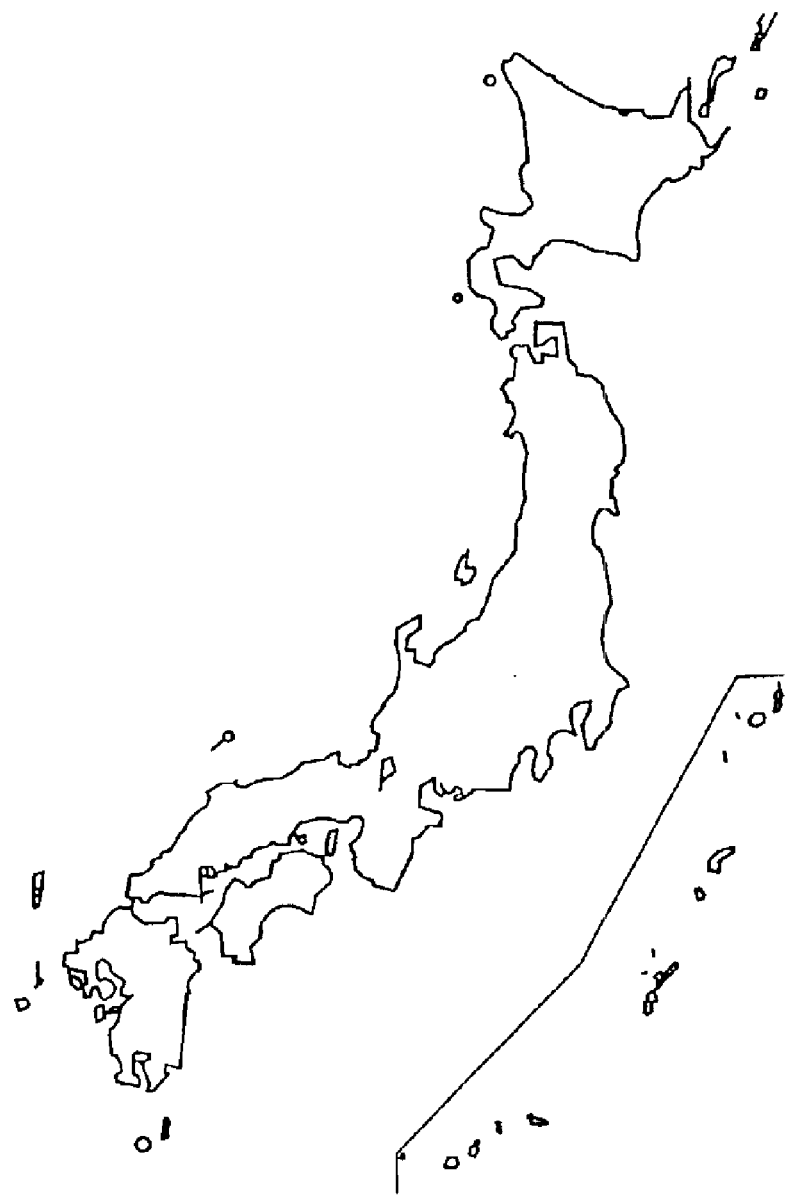
FIG. 9 shows an example of highest layer map data distributed from the data center according to the first embodiment of the invention.

FIG. 6 explains layered map data distributed from a data center 51 according to the first embodiment of the invention. FIG. 7 shows an example of lowest-layer map data distributed from the data center 51 according to the first embodiment of the invention. FIG. 8 shows an example of intermediate-layer map data distributed from the data center 51 according to the first embodiment of the invention. FIG. 9 shows an example of highest-layer map data distributed from the data center 51 according to the first embodiment of the invention.

As an example, and for ease of explanation, the following description assumes that the data center 51 distributes the map data about the operator's designated area to the operator terminal 53 upon receipt of the data-distribution request, by which a map data version is designated, there is three-layered map data and the lowest-layer map data covers the operator's designated area, the operator designates the area on a prefecture basis, and Aichi-prefecture, in which the operator lives, is designated.

In order to update the map data to the latest-version, the operator takes the following operations. First, the operator operates the operator terminal 53 to transmit the data-distribution request for the latest-version map data about Aichi-prefecture to the data center 51 via the network 52. Upon receipt of such request, the data center 51 distributes the latest-version map data about Aichi-prefecture to the operator terminal 53 via the network 52. At this point, a payment for the latest-version map is demanded of the operator according to a common payment method. In the present embodiment, for convenience of explanation, the payment method is not detailed.

The map data distributed from the data center 51 is tri-layered as shown in FIG. 6. The lowest-layer map data covers the operator's designated area, while the highest-layer map data covers a wider area that includes the area covered by the lowest-layer map data. Here, the lowest-layer covers Aichi-prefecture as shown in FIG. 7. According to the invention, the lowest-layer may include plural blocks and each block may cover, for example, an eighteen-square-kilometer area or cover the area on a basis of city, town, or village.

The intermediate-layer block covers the Chubu district in which Aichi-prefecture is included as shown in FIG. 8. According to the invention, the intermediate-layer may include plural blocks. In such case, each intermediate-layer block may cover, for example, a ninety-square-kilometer area or cover the area on a prefecture basis.

Furthermore, according to the invention, the highest-layer block may cover all of Japan in which both the Chubu district and Aichi-prefecture are included as shown in FIG. 9.

Thus, the latest-version map data distributed from the data center differs in size layer by layer. As explained above, the map data about the smallest area, i.e., Aichi-prefecture, is distributed for the lowest-layer; the map data about the intermediate-size area, i.e., the Chubu district, including Aichi-prefecture, is distributed for the intermediate-layer; and the map data about the widest area, i.e., all over Japan is distributed for the highest-layer. In this manner, the map data in every level layer may be updated to the latest-version.

The distributed map data contains the map display data, the route guidance data, the route search data, the retrieval data, the audio data, and the image data. Especially, both the map display data and the route search data are contained in every block of every layer. In the first embodiment, both the map display data and the route search data are contained in each map data about Aichi-prefecture, the Chubu district, and all of Japan. The route guidance data is contained only in the lowest-layer map data about Aichi-prefecture. As for the audio data and the image data, only a supplementary piece thereof is distributed and contained in the lowest-layer map data about Aichi-prefecture. Supplementary audio data is the data required to update an old version to the latest-version.

As for the retrieval data, only the differential data thereof is distributed from the data center. Here, the differential data represents differences between the latest-version map data and the earlier-version map data. Specifically, the differential data is composed of supplementary data and erase data. The supplementary data represents data, which is added to the latest-version map data, about newly constructed facility and roads. The erase data represents the data, which is erased from the earlier-version map data, about the torn down or closed-down facilities and roads having changed characteristics or roads that have been added or eliminated. Further, the supplementary data contains data about the point of a facility as well as data about a retrieval method.

The lowest-layer map data contains the specific road network comprising the expressways, the national highways, the prefectural highways, the principal municipal roads, and narrow roads. Therefore, the amount of the data per unit area covered by the lowest-layer map data seems large. However, the amount of the lowest-layer map data is actually reduced as a whole because the area covered by each lowest-layer block is small compared to the other layers. Accordingly, the intermediate-layer map data, covers a wider area than the area covered by the lowest-layer map data. Therefore, the amount of the map data per unit area covered by the intermediate-layer map data seems larger than that by the lowest-layer map data. However, the amount of the intermediate-layer map data as a whole is actually smaller than that of the lowest-layer map data because the intermediate-layer map data contains the fundamental road network that contains only the expressways, the national highways, and the principal municipal roads, rather than all of the roads. The highest-layer map data covers an even wider area than the intermediate-layer map data. However, the amount of the map data per unit area covered by the highest-layer map data is smaller than that covered by the intermediate-layer map data because the highest-layer map data contains the nationwide arterial road network that contains only the expressways and the principal national highways. Therefore, as a whole, the amount of highest-layer map data is reduced. To sum up, as a result of this data structure, the entire amount of the map data distributed from the center is reduced. This saves a great deal of transmission time for distributing the map data to the operator terminal 53 via the network 52.

After the operator terminal 53 receives the map data from the data center 51, the operator inserts the external storage medium 55 into the operator terminal 53 to download the distributed map data onto the external storage medium 55.

Then, the external storage medium 55, having the downloaded map data, is inserted into the on-board device 14. Subsequently, the on-board device 14 is operated to upload the distributed map data from the external storage medium 55. As a result, the map data stored in the data storage 16 is updated to the latest-version of the map data. It should be noted that, the earlier-version map data before such update is not erased but intactly preserved in the storage 16.

If the amount of the map data distributed from the data center 51 exceeds the total storage capacity of the external storage medium 55, the map data may be split into several pieces and each split piece is downloaded to the external storage medium 55 one by one. Next, the split map data is uploaded to the on-board device 14 piece by piece. Then, each split map data is put together and stored in the data storage 16.

Next, 3 scenarios requiring operations for route search in the search job 12 will be described with reference to the following drawings.

Figure 10:
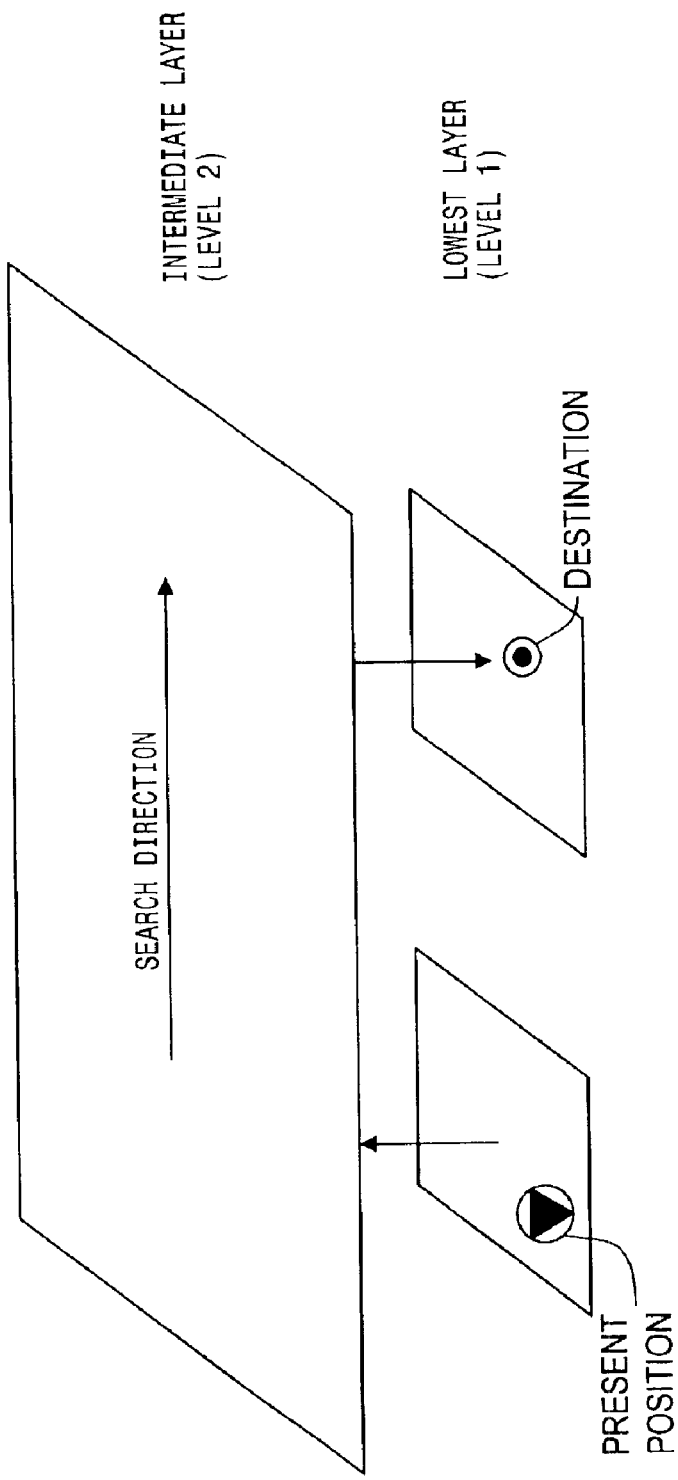
FIG. 10 explains the second case wherein route search is carried out based on updated map data according to the first embodiment of the invention.
Figure 11:
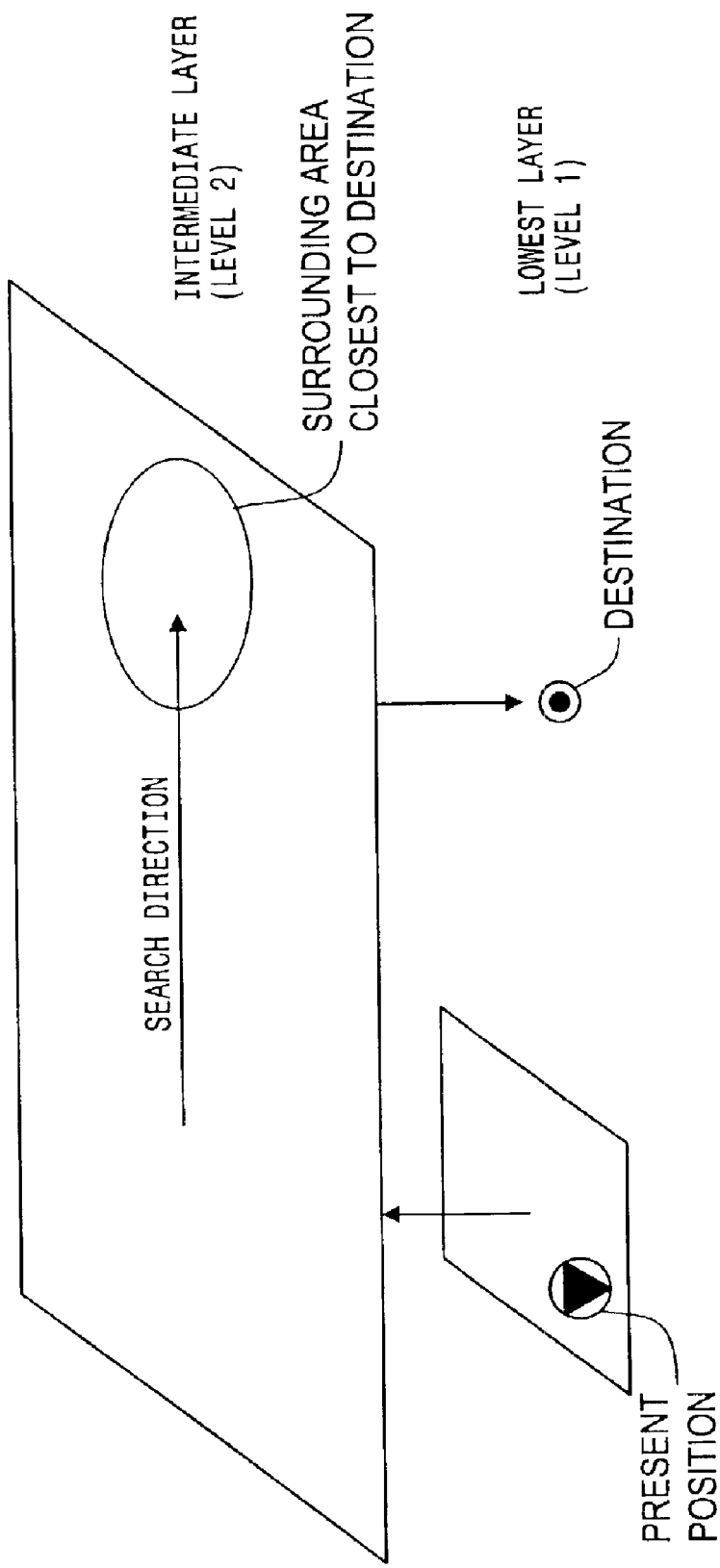
FIG. 11 explains the third case wherein route search is carried out based on the updated map data according to the first embodiment of the invention.

FIG. 10 explains the second scenario wherein route search is carried out based on updated map data according to the first embodiment of the invention. FIG. 11 explains the third scenario wherein route search is carried out based on the updated map data according to the first embodiment of the invention.

In the first scenario, the operator operates the input unit 34 to select a destination and thereupon a route from a present position to a destination is searched in the search job 12. In this example, and for ease of explanation, the following description assumes that both the present position and the destination are located within Aichi-prefecture, designated by the operator.

Further, in the first scenario, if the distance from the present position to the destination is short, and, if such present position and destination are located within the area covered by one lowest-layer block, the search job 12 offers a route search that is carried out by processing the latest-version map data stored in the one lowest-layer block. Thereby, a route from the present position to the destination is properly searched even if a new road is opened.

Next, a second scenario where the present position and the destination, which are within Aichi-prefecture, are located within two different areas and covered by two different lowest-layer blocks. In this second scenario, the search job 12 offers a route search that is carried out by processing the latest-version map data stored in three different blocks as shown in FIG. 10. The three blocks are: the lowest-layer block covering the surrounding area closest to the present position, the lowest-layer block covering the surrounding area closest to the destination, and the intermediate-layer block covering the area in which both the present position and the destination are included. Here, not only the latest-layer map data but also the intermediate-layer map data, about the Chubu district, is updated to the latest-version map data in accordance with the operation for map data update previously described. Therefore, a route can be properly searched even if the new road is opened.

In the third scenario, the present position is located in Aichi-prefecture, the designated area, while the selected destination is located in Shizuoka-prefecture adjacent to Aichi-prefecture. In this third scenario, both the present position and the destination are located within the area covered by one intermediate-layer block.

In the third scenario, on one hand, the map data in the lowest-layer block about the surrounding area closest to the destination is not updated to the latest-version map data but kept as the earlier-version map data. This is because the operator does not designate Shizuoka-prefecture but Aichi-prefecture for the map data. On the other hand, the map data in the lowest-layer block about the surrounding area closest to the present position as well as the map data in the intermediate-block about the Chubu district that includes Aichi-prefecture and Shizuoka-prefecture are updated to the latest-version map data. That is, only the map data in the lowest-layer block remains as the earlier-version map data. Accordingly, the map data in the lowest-layer block about the surrounding area closest to the destination is not used for the route search in the search job 12.

Generally, according to the invention, it is impossible to carry out the route search and the route guidance based on some pieces of the map data that differ from one another in data version. The reason for this will be described as follows.

For example, as shown in FIG. 3 the route search data contains various data about a plurality of roads. Each road consists of a plurality of componential units called a link. Each link is separated and defined by an intersection having more than three roads or defined by a point at which the road type changes. Therefore, the number of links is enormous. Each road and each link are given an identifying code or an identifying number. Further, the map display data contains coordinates data about a plurality of nodes. A node is a point located along a road. The number of the nodes is enormous, since every node is set along the road at specific intervals to such an extent that one can recognize the shape of the road. For example, the node may be set at several-ten-meter intervals. The node is set at short intervals if the road is curved while the node is set at long intervals if the road is straight. The route search data and the map display data are associated with each other so that a link and a node may be associated with each other. Accordingly, the number of links and the number of nodes are enormous. Therefore, naturally, the number of processes for associating the links with the nodes becomes enormous. That is, as the number of processes increases, so does a workload for the system.

Hence, the number of the processes as well as the workload would be enormous when the route search data and the map display data are associated with each other for creating the latest-version map data. That is, as a whole, it takes a long time to create and organize the latest-version map data. Naturally enough, the number of processes reaches astronomical figures when the latest-version map data is associated with the earlier-version map data. As a result, the workload becomes huge and the time to associate the data becomes infinite. Theoretically, it is possible to associate the latest-version map data with the earlier-version map data. Practically, it is almost impossible to carry out such operation in the system in view of the number of processes, the workload, and the process time. For this reason it is impossible to carry out the route search and the route guidance based on some pieces of the map data that differ from one another in data versions.

Thus, when the lowest-layer map data about the surrounding area closest to the selected destination is not used, as in the third scenario, the search job 12 may offer the route search that is carried out by using the map data stored in the intermediate-layer block as shown in FIG. 11. In the third situation, the intermediate-layer block contains no data about the prefectural highways, nor any roads more minor than that prefectural highway, but contains data about the principal roads, such as the expressways, the national highways, and the principal municipal roads. Therefore, generally speaking, a route to the destination is searched based on such principal roads. Strictly speaking, the route, until a point, which is closest to the destination and located on such principal road, is searched based on coordinates of the destination.

In the search job 12, the identifying code or the identifying number given to each road and each link is used. As explained above, in the third scenario, the version of the lowest-layer map data about the surrounding area closest to the present position is the same as that of the intermediate-layer map data. Likewise, the identifying code or the identifying number contained in the road data stored in the lowest-layer block is the same as that stored in the intermediate-layer block. This allows the navigation apparatus to search a route from the present position until a point, which is closest to the destination, located on the principal roads. This route search is based on both the map data in the lowest-layer block about the surrounding area closest to the present position and the map data in the intermediate-layer block. However, in the third scenario, as previously described, the version of the lowest-layer map data about the surrounding area closest to the destination differs from that of the intermediate-layer map data. In other words, the identifying code or the identifying number given to the road and the link, which stored in the road data about the surrounding area closest to the destination in the lowest-layer block, is different from that in the intermediate-layer block. Therefore, in the third scenario, the lowest-layer map data for the destination is not used but only the intermediate-layer map data is used in searching a route in the route search job 12.

Thus, two blocks, i.e., the lowest-layer block covering the principal roads around the present position and the intermediate-layer block covering the principal roads running between the present position and the destination, contain the latest-version map data. This allows the search job 12 to offer proper route search even if a new principal road is opened.

In the above third scenario, the present position is within Aichi-prefecture while the selected destination is outside of Aichi-prefecture. However, there may be a situation to the contrary. For example, there may be a situation where the present position is within Shizuoka-prefecture while the destination is within Aichi-prefecture. In such a situation, the operations for the route search are carried out in the same manner as the previously described third scenario. Because of this, for convenience of explanation, the compositions and operations in the contrary case are not detailed here.

Furthermore, in the third scenario, there may be another circumstance where the lowest-layer block covers Shizuoka-prefecture and the map data contained therein has been updated to the latest-version map data. In this circumstance, the operations for route search may be carried out in the same way that is taken in the previously described first scenario where both the present position and the destination are within Aichi-prefecture. Moreover, similar to the previously described second scenario, if the present position and the destination are within Aichi-prefecture but located apart from each other, and therefore either the present position or the destination is out of the area covered by one intermediate-layer block, the highest-layer map data is also used in the route search. In such case, the search job 12 uses five blocks: two lowest-layer blocks covering respectively the surrounding area closest to the present position and the destination, two intermediate-layer blocks covering respectively the surrounding area closer to the present position and the destination, and one highest-layer block covering the area that includes both the present position and the destination.

Next, the operations for facility retrieval in the retrieval job 11 will be described.

First, the operator operates the input unit 34 to input a retrieval condition, such as a name of the facility or a point of the facility. Thereupon, the facility that meets such retrieval condition is retrieved. In the retrieval job 11, a candidate for the desired facility is retrieved from the respective retrieval data contained in both the latest-version map data and the earlier-version map data.

Then, it is checked whether the retrieved facility is included in the erase data. If the retrieved facility is included in the erase data, the screen in the display unit 35 displays such to the operator or the audio output unit 37 tells such to the operator. If the retrieved facility is not included in the erase data, such retrieved facility can be displayed onto the screen in the display unit 35. If the retrieved facility is included in both the latest-version map data and the earlier-version map data, it is judged that information whether that retrieved facility has been updated. Therefore, the information about the retrieved facility included in the latest-version map data is displayed onto the screen.

When the facility is retrieved from the retrieval data in the latest-version map data, it is desirable that the screen in the display unit 35 should display such to the operator. Thereby, the operator can confirm that the desired facility has been retrieved based on the latest-version map data.

An alternative method of retrieving the facility is as follows. If the operator operates the input unit 34 to input a telephone number as the retrieval condition (in other words, if telephone number retrieval is carried out), the facility is retrieved by processing the retrieval data contained in both the latest-version map data and the earlier-version map data. Subsequently, it is checked whether the retrieved facility is included in the erase data. If the retrieved facility is included in the erase data, the screen in the display unit 35 displays such to the operator or the audio output unit 37 tells such to the operator. If the retrieved facility is not included in the erase data, the retrieved facility is displayed as a telephone retrieval result onto the screen in the display unit 35.

Again, if the facility is retrieved from the retrieval data in the latest-version map data, it is desirable that the screen in the display unit 35 should display and tell such to the operator. Thereby, the operator can confirm that the desired facility has been retrieved based on the latest-version map data.

Moreover, still another method of retrieving the facility is as follows. If the operator operates the input unit 34 to input a character string that represents the name of the facility (in other words, if Japanese-syllabic-basis retrieval is carried out), the facility is retrieved on a character-by-character basis. Whenever the characters for the facility name are inputted one by one, the facility is retrieved by processing both the retrieval data contained in the latest-version map data and in the earlier-version map data. Upon the facility retrieval, an inventory of retrieved facilities is made. The inventory and the number of the facilities listed therein are displayed onto the screen in the display unit 35.

In this Japanese-syllabic-basis retrieval, it is checked whether the retrieved facility is included in the erase data. If the retrieved facility is included in the erase data, the screen in the display unit 35 displays such to the operator. If the facility is retrieved from the retrieval data contained in the latest-version map data, it is desirable that the screen should display and tell such to the operator. Thereby, the operator can confirm that the desired facility was retrieved based on the latest-version map data.

Next, operations for map display onto the screen in the display unit 35 in the display control job 13 will be described.

First, the operator operates the input unit 34 to set a display condition. Thereupon, a map is displayed on the screen in the display unit 35 in a display style that is defined by the display condition. If the display condition is not set, the map is displayed in a default style according to an initial condition.

There is sometimes a situation where a border is superimposed on the map drawn on the screen. The border is a line separating two areas, one area depicted based on the latest-version map data and another area depicted based on the earlier-version map data. In such a situation, the display control job 13 offers a map display in which the one area depicted based on current data (described hereinafter) is discernible from other areas. This current data is referred to in drawing the map on the screen. The current data comprises the latest-version map data, map data about the area including the present position, and map data about the area including a central position of the map currently drawn on the screen. Whether the map display is referring to the current data or not may be determined with the operation of the input unit 34.

Here, for ease of explanation the following description assumes that Aichi-prefecture is designated for the map data update by the data-distribution request, and thereupon the map data about Aichi-prefecture is updated to the latest-version one.

For example, assume that the current data is in the latest-version and the map is drawn based on the lowest-layer map data. In such a situation, the map is drawn with no speciality on the screen in so far as only Aichi-prefecture is drawn onto the map. By contrast, if both Aichi-prefecture and Shizuoka-prefecture are simultaneously drawn onto the map as well as if only the map data about Shizuoka-prefecture is not in the latest-version, i.e., not the current data, the Shizuoka-prefecture map is displayed discernibly from Aichi-prefecture map on the screen. In such case, the Shizuoka-prefecture map drawn based on other data, excluding the current data, and may be displayed in a toned-down color on the screen. This helps the operator to discern the Aichi-prefecture map from the Shizuoka-prefecture map in terms of the data versions. The color of the area based on other data, excluding the current data, is not limited to the toned-down color but may be changed to various other colors.

Specifically, the Aichi-prefecture map is displayed in a high-tone color while the Shizuoka-prefecture map is displayed in a low-tone color with reference to the border between them. This tells the operator that the map data about Aichi-prefecture is in the latest-version while the map data about Shizuoka-prefecture is in an earlier-version. Therefore, even if representational consistency between Aichi-prefecture map and Shizuoka-prefecture map is lost due to data-version difference, the operator is neither surprised nor bewildered.

As for discernible representation, not only the map but also the roads drawn therein may be discernibly displayed. For example, roads located within the area covered by the current data are displayed with a solid line while roads located within the area covered by other data are displayed with a broken line. As a result, even if the representational consistency of the road is lost due to the data-version difference, the operator is not surprised. Specifically, if a representational mismatch between a road within Aichi-prefecture and a corresponding road within Shizuoka-prefecture occurs with reference to the border, the discernible lines (solid line and broken line) can tell the operator that the map data about Aichi-prefecture is in the latest-version while the map data about Shizuoka-prefecture is in an earlier-version. Therefore, the operator is neither surprised nor bewildered even if the representational consistency between Aichi-prefecture map and Shizuoka-prefecture map is lost due to data-version differences.

The discernible display characteristics are also applicable to a scroll-display. For example, if the map is scrolled from Aichi-prefecture to Shizuoka-prefecture, the Aichi-prefecture map is displayed in high-tone color while the Shizuoka-prefecture map is displayed in low-tone color with reference to the border. This helps the operator to discern the Aichi-prefecture map from Shizuoka-prefecture map in terms of the data versions.

If the current data is updated, it is desirable that the screen in the display unit 35 should display such to the operator or the audio output unit 37 should tell such to the operator.

In this connection, if the operator operates the input unit 34 to change the display scale of the map and thereby a wider area map, i.e., the map drawn based on the intermediate-layer map data is displayed, the map data about Shizuoka-prefecture is considered to be the current data because, as previously described, the intermediate-layer map data about the Chubu district is in the latest-version. In this situation, both the Shizuoka-prefecture map and the Aichi-prefecture map are displayed in the same tone color. In other circumstances, for example, where the Chubu district and the Kanto district are displayed at the same time onto the screen, the intermediate-layer map data about other districts excluding the Chubu district might be in the earlier version. Therefore, if both the Chubu district and the Kanto district are displayed onto the screen at the same time, the Kanto district map is displayed in low-tone color so as to be discernible from the Chubu district map.

Furthermore, if the operator operates the input unit 34 to change the display condition so a widest area map is displayed, the highest-layer map data about all of Japan is considered to be the current data. In this case, the area covered by the other data, excluding the current data, is not displayed on the screen.

Thus, according to the first embodiment, the latest-version map data about the designated area may be distributed from the data center 51 via the network 52, and then the distributed map data is uploaded to the on-board device 14 for updating the earlier-version map data. In this case, the latest-version map data distributed from the data center 51 has a layered structure: the lowest-layer contains map data about only a designated area, the intermediate-layer contains map data about a district including the designated area, and the highest-layer contains map data about all of Japan.

Because of such a layered structure, the entire amount of the map data distributed from the data center 51 becomes small. This saves a great deal of transmission time for distributing the map data to the operator terminal 53 via the network 52. Advantageously, the first embodiment provides a navigation apparatus by which the operator can update map data about only the area he or she designates. In other words, the operator is not forced to obtain or receive the map data he or she does not need. As a result, the operator does not have to pay for the map data about the area for which the map data is unneeded. This can reduce the operator's economic burden.

In addition, according to the first embodiment, the earlier-version map data is not erased but intactly preserved in the data storage 16. Therefore, the data storage 16 stores both the earlier-version map data and the latest-version map data. As for the route search, a route is searched based on the latest-version map data as far as the present position or the destination is within the area covered by the latest-version map data. Thereby, a route may be properly searched even if a new road is opened.

According to the first embodiment, when both the map of one area covered by the latest-version map data and the map of another area covered by an earlier-version map data are drawn on the screen at the same time, these maps may be displayed in a manner that one area is discernible from another. This helps the operator to discern one version from another. Accordingly, even if the representational consistency between the one area map and another area map is lost due to data-version difference, the operator will be neither surprised nor bewildered.

Lastly, with respect to facility retrieval in the retrieval job 11, according to the first embodiment, the facility is retrieved doubly based on both the retrieval data included in the latest-version map data as well as the earlier-version map data. Thereby, the accuracy of facility retrieval is increased.

Next, a second embodiment according to the invention will be described with reference to the following drawings. For convenience of explanation, the same compositions and operations according to the first embodiment are not described again.

Figure 12:
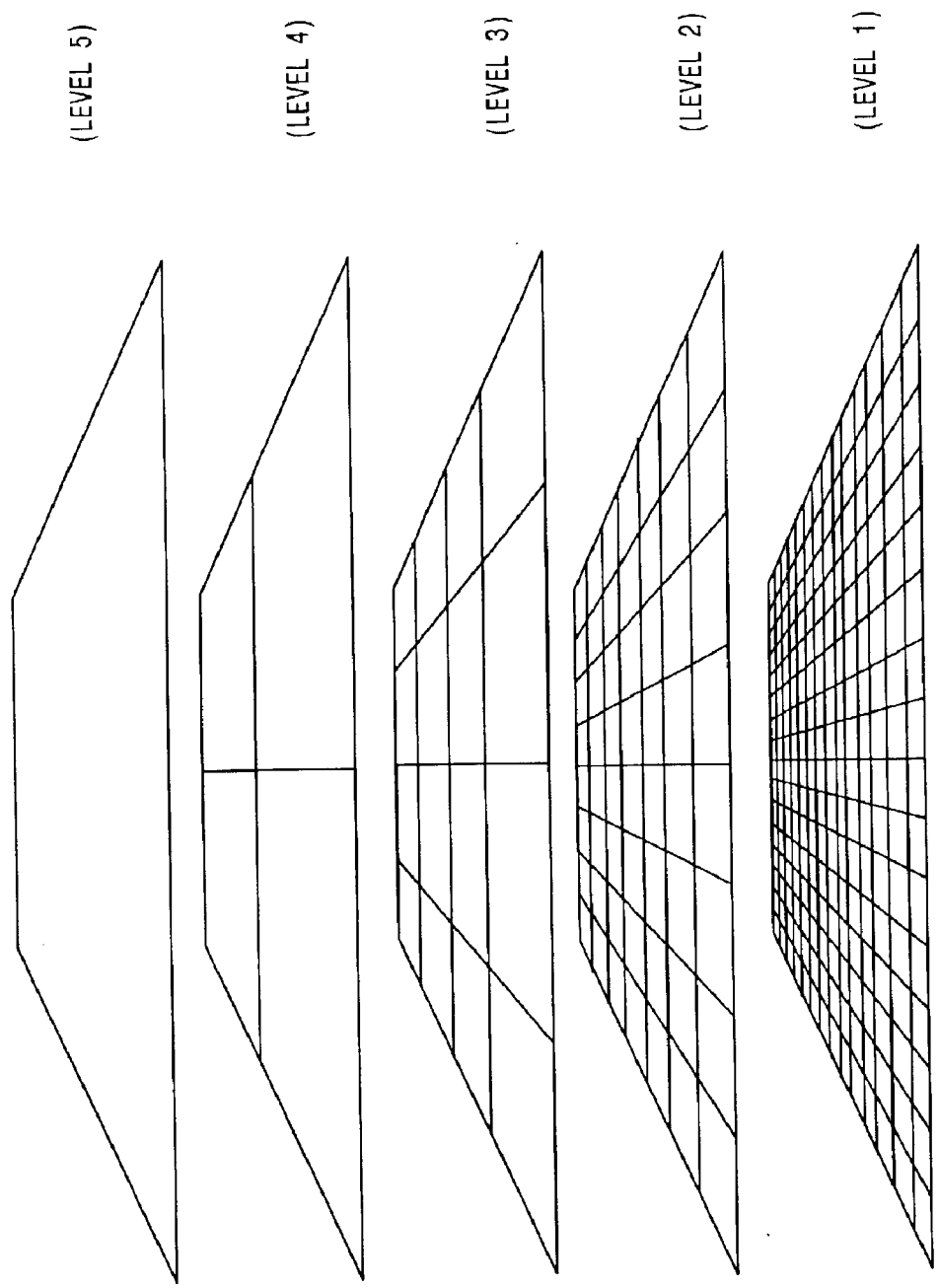
FIG. 12 explains layered map data according to a second embodiment of the invention.
Figure 13:
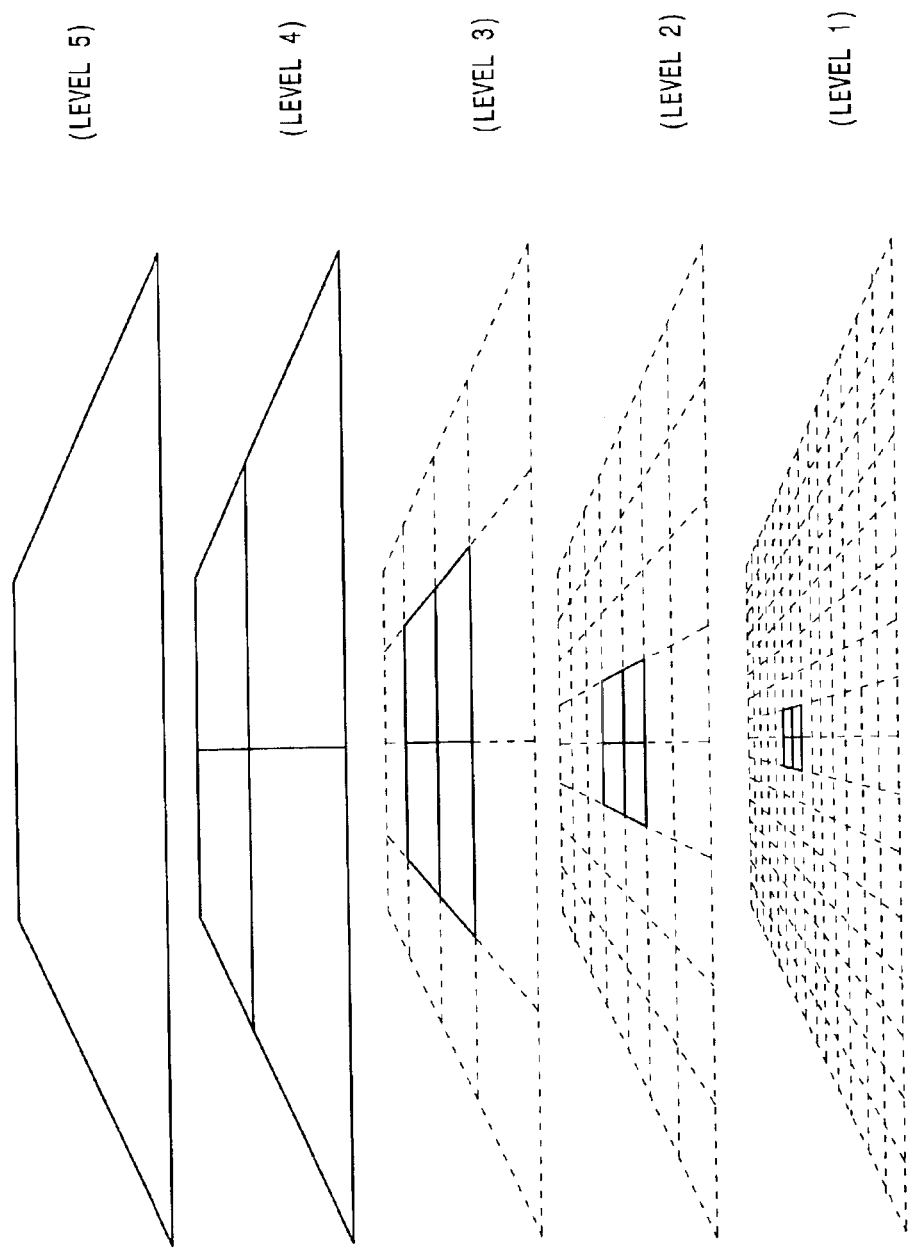
FIG. 13 explains layered map data distributed from the data center according to the second embodiment of the invention.

FIG. 12 explains layered map data according to a second embodiment of the invention. FIG. 13 explains layered map data distributed from the data center 51 according to the second embodiment of the invention.

According to the second embodiment, there is five-layer map data stored in the storage 16 as shown in FIG. 12. In this embodiment, the Level 1 layer covers a 20,000:1 scale map, the Level 2 layer covers a 80,000:1 scale map, the Level 3 layer covers a 320,000:1 scale map, the Level 4 layer covers a 1,280,000:1 scale map, and the Level 5 layer covers a 5,120,000:1 scale map.

Like FIG. 12, the map data distributed from the data center 51 upon receipt of the data-distribution request from the operator terminal 53 has a five-layer structure as shown in FIG. 13. Like the first embodiment, the map data in the lowest-layer (Level 1) covers the designated area while the map data in the higher-layer covers a wider area that includes an area covered by the lower-layer map data. Specifically, a block contained in the lowest-layer (Level 1) covers the designated area. A block contained in the higher-layer (Level 2) covers a wider area that includes the designated area. A block in the higher-layer (Level 3) covers a further wider area that includes the area covered by the Level 2 block. A block in the higher-layer (Level 4) covers an even further wider area that includes the area covered by the Level 3 block. A block in the highest-layer (Level 5) covers a widest area that includes the area covered by the Level 4 block.

In other embodiments of the invention, the described five-layered map data may have a different multi-layer structure, for example, a ten-layer structure. Further, the number of the layers may be varied according to the amount of data contained in the map data. For example, the map data may have a ten-layer structure in which the route search data has a three-layer structure.

Now, a third embodiment according to the invention will be described. For convenience of explanation, the same compositions and operations according to the first embodiment and the second embodiment are not described again.

In the third embodiment, the description centers on operations for route guidance visually given to the operator. In the display control job 13, if the version of the map display data is the same as that of the route search data used in the search job 12, the searched route is superimposed onto the map drawn based on the lowest-layer map data. By contrast, if the version of the map display data is different from that of the route search data used in the search job 12, the searched route is superimposed onto the map that covers a wider area, i.e., the map drawn based on the higher-layer map data.

A first scenario will be described where the version of the route search data used in the search job 12 is the same as that of the map display data used in displaying the searched route onto the screen in the display unit 35 in the display control job 13.

In the on-board device 14, the display control job 13 offers a map display wherein a route searched in the search job 12 is superimposed onto a map on the screen. The operator is given the route guidance visually according to the displayed map. Generally, the map is drawn based on the map display data contained in the lowest-layer (Layer 1) map data.

For example, in the scenario where a route search is carried out based on the latest-version map data like the first and second situations in the first embodiment, the search job 12 uses the latest-version route search data about Aichi-prefecture. In the operations according to the first and second scenarios in the first embodiment, a route from the present position to the destination is located within Aichi-prefecture; in other words, the route from the present position to the destination may be included in the lowest-level layer map data. In such a situation, in the display control job 13 the searched route is superimposed onto the map drawn using the latest-version map display data.

Further, with respect to the third embodiment a second situation will be described where the version of the route search data used in the search job 12 is different from that of the map display data used in the display control job 13. For example, in the case of the operations for the route search according to the third scenario in the first embodiment, the route search data about Aichi-prefecture used in the search job 12 is in the latest-version. However, because the lowest-layer map data about Shizuoka-prefecture is not updated in the third scenario in the first embodiment, the map data in the intermediate-layer is used for searching a route to the destination that is located within Shizuoka-prefecture.

As described in the first embodiment, the route guidance visually given to the operator cannot be carried out based on map data that differs with respect to data versions. This is because the identifying number and identifying code given to the road and link are not common to respective map data that differs with respect to version. Therefore, on one hand, in the display control job 13, the route (searched based on the route search data in the lowest-layer) may be superimposed onto a map which is drawn using the map display data in the lowest-layer as far as the searched route is located within Aichi-prefecture. On the other hand, if such searched route is outside of Aichi-prefecture, the searched route cannot be superimposed onto the map. This is problematic.

To solve such a problem, the third embodiment provides the display control job 13 in which the searched route may be superimposed onto the map which is drawn using the map display data in the intermediate-layer even if the searched route is outside of Aichi-prefecture. In the display control job 13, the route being outside of the area covered by the latest-version lowest-layer map data may be superimposed onto the map which is drawn using the latest-version higher-layer map data.

Thus, the route guidance is visually given to the operator even if the version of the route search data used in the search job 12 is different from that of the map display data in the display control job 13.

Hereinafter, a fourth embodiment according to the invention will be described with reference to the following drawings. For convenience of explanation, the same compositions and operations according to the first, second, and third embodiment are not described here.

FIG. 14 shows a first situation wherein route search is carried out according to a fourth embodiment of the invention. FIG. 15 shows a second situation wherein route search is carried out according to the fourth embodiment of the invention. FIG. 16 shows a third situation wherein route search is carried out according to the fourth embodiment of the invention.

According to the previously described third embodiment, if the version of the route search data used in the route search job 12 is different from that of the map display data, the route being outside of the area covered by the latest-version, lowest-layer map data may be superimposed onto the map drawn based on the latest-version map data in the higher-layer. However, this creates some problems. The map drawn on the screen is automatically and suddenly scaled-down, and thereby the operator is bewildered at such a sudden scale change. The scaled-down map, i.e., the roughly drawn map, is not friendly to the operator who wants to confirm the route out of the designated area.

For example, in the case of the operations for the route search according to the third scenario in the first embodiment, the map is switched from one based on map display data in one lowest-layer to another that is drawn based on the map display data in the intermediate-layer. This switching occurs when the vehicle (present position) on the route is entering Shizuoka prefecture from Aichi-prefecture. Upon switching the map, the scale of the map is reduced and the road is displayed roughly. Such a scaled-down map is unfriendly to the operator who travels around an unfamiliar place for the first time. Further problematic is that some operators would be surprised at a sudden map-scale change when he or she crosses the border to enter Shizuoka-prefecture.

To solve these problems, the fourth embodiment provides an on-board device 14 that carries out the following operations. If the present position is located within the area covered by the latest-version lowest-layer map data, the operator may be guided along the route that is searched based on the latest-version route search data. By contrast, when the present position is not located within the area covered by the latest-version lowest-layer map data, the operator may be guided along the route that is searched based on the earlier-version lowest-layer route search data. In this connection, when the operator is guided along the route searched based on the latest-version route search data, such route is superimposed onto the map drawn using the latest-version lowest-layer map display data. By contrast, when the operator is guided along the route searched based on the earlier-version route search data, such route is superimposed onto the map drawn using the earlier-version lowest-layer map display data.

When the vehicle (i.e., present position) gets out of the area covered by the latest-version lowest-layer map data, the route is re-searched based on the earlier-version lowest-layer route search data in the search job 12 and the operator is guided along using the re-searched route. In addition, if the vehicle enters again the area covered by the latest-version lowest-layer map data again, the route may be re-searched again based on the latest-version route search data. That is, whenever the vehicle enters the area covered by the latest-version lowest-layer map data, the route may be re-searched based on the latest-version route search data and thereby the operator may be guided along such re-searched route.

Figure 14A:
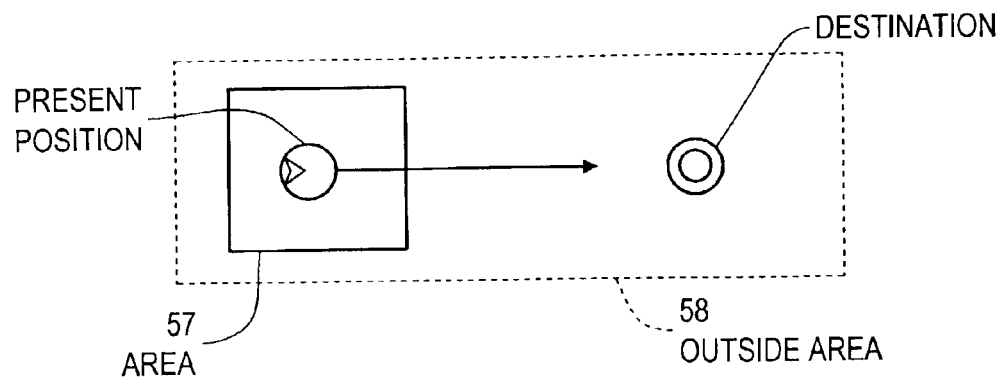
FIG. 14 shows the first case wherein route search is carried out according to a fourth embodiment of the invention.

Hereinafter, the aforesaid operations according to the present fourth embodiment will be described in detail with reference to FIGS. 14–16. Here, the description considers a first scenario as shown in FIG. 14(a) where the present position is located within an area 57 covered by the latest-version lowest-layer map data while the destination is located within an outside area 58. The operations described hereunder correspond to those described in the previously described third scenario in the first embodiment. Therefore, the description here considers the area 57 as Aichi-prefecture and the outside area 58 as Shizuoka-prefecture.

Figure 14B:
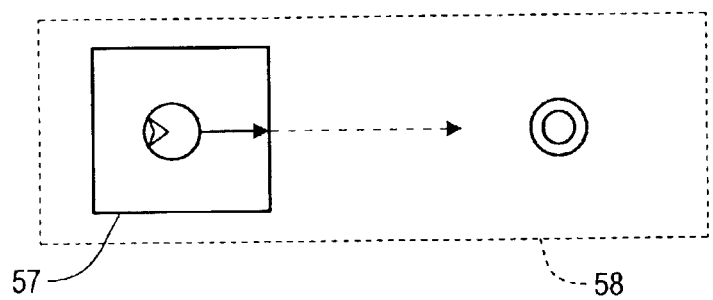

In this scenario, as already described in the third scenario in the first embodiment with reference to FIG. 11, the route is searched as follows. First, the route around the present position is searched using the latest-version lowest-layer route search data while the route around the destination is searched, not based on the earlier-version lowest-layer route search data, but based on the latest-version intermediate-layer route search data. When the present position is within the area 57 (Aichi-prefecture) as shown in FIG. 14(b), the searched route is superimposed onto the map drawn using the latest-version lowest-layer map display data in the display control job 13. At this time, the route being out of the area 57 and located within the other area 58 (Shizuoka-prefecture) depicted based on the earlier-version map display data is not superimposed on the map because the map of the other area 58 is displayed based on the earlier-version lowest-layer map display data.

Figure 14C:
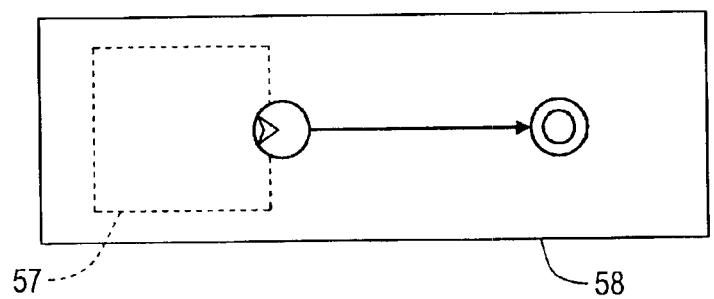

Upon crossing the border between the area 57 and the area 58 as shown in FIG. 14(c), the route is re-searched by using the earlier-version lowest-layer route search data in the search job 12. Subsequently, when the vehicle completely enters the area 58, the re-searched route is superimposed onto the map which is drawn by processing the earlier-version lowest-layer map display data in the display control job 13.

Figure 15A:
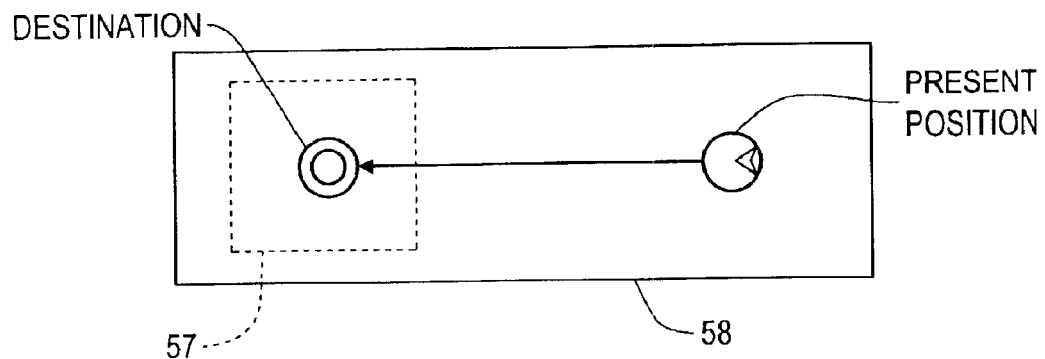
FIG. 15 shows the second case wherein route search is carried out according to the fourth embodiment of the invention.
Figure 16A:
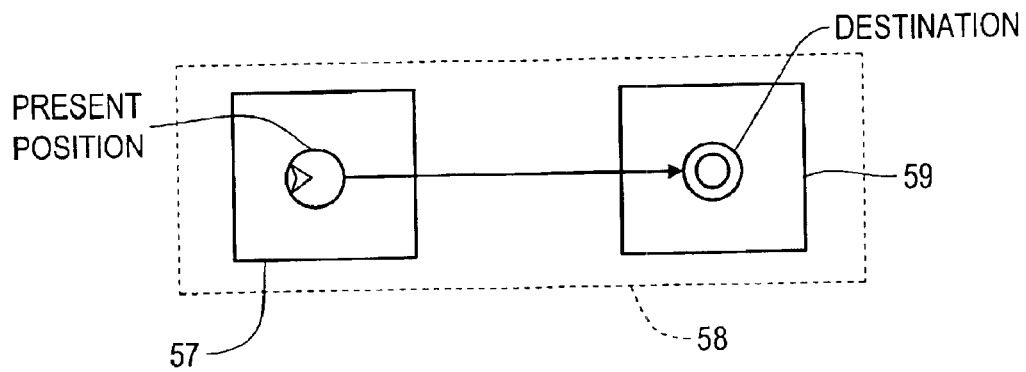
FIG. 16 shows the third case wherein route search is carried out according to the fourth embodiment of the invention.
Figure 16B:
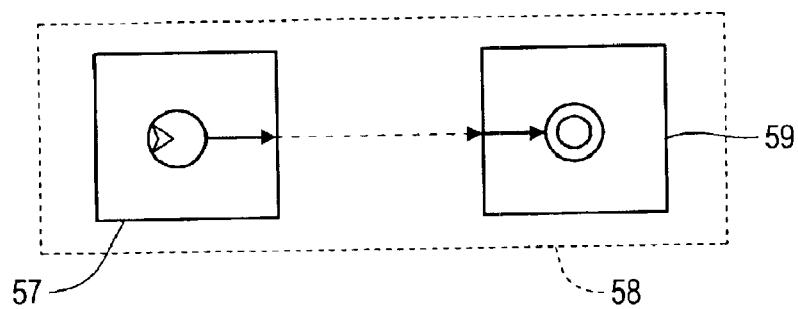
Figure 16C:
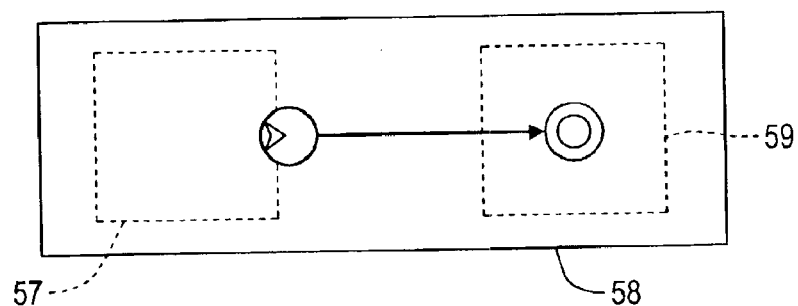

Next, the description of the fourth embodiment describes a second scenario where the present position is located within the outside area 58 while the destination is located within the area 57 covered by the latest-version lowest-layer map data as shown in FIG. 15(a).

Figure 15B:
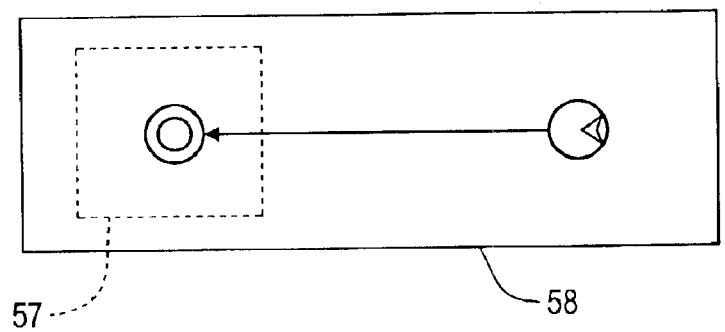

In this case, in the search job 12, at first the route from the present position to the destination is searched based on the earlier-version route search data. Then, the route guidance is carried out along that searched route. As far as the present position is within the outside area 58 as shown in FIG. 15(b), the searched route is superimposed onto the map which is drawn based on the earlier-version lowest-layer map display data in the display control job 13.

Figure 15C:
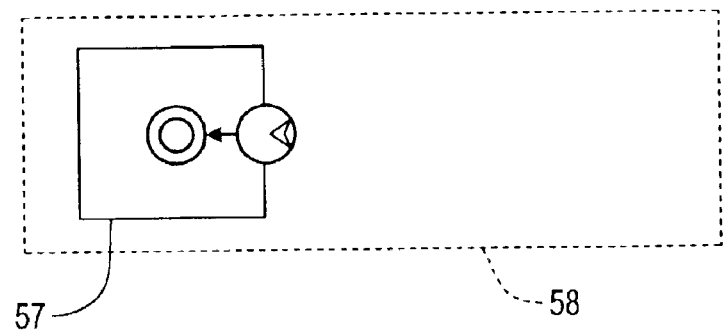

Upon crossing the border between the area 58 and the area 57 as shown in FIG. 15(c), the route is re-searched by using the latest-version route search data. Then, when the present position completely enters the area 57, the re-searched route is superimposed onto the map which is drawn based on the latest-version lowest-layer map display data in the display control job 13.

Next, the description of the fourth embodiment takes a third scenario where the present position is located within the area 57 covered by the latest-version lowest-layer map data and the destination is located within an area 59 covered by the latest-version lowest-layer map data. In this situation, the area 57 and the area 59 are located apart from each other, and the outside area 58 stretches between the area 57 and the area 59. Here, the area 57 and the area 59 are respectively Aichi-prefecture and Yamanashi-prefecture, both of which are designated by the operator. Further, the map data is in the following conditions. The respective Level 1 layer map data about Aichi-prefecture and Yamanashi-prefecture are updated to the latest-version map data. The Level 2 layer map data about the Chubu district in which Aichi-prefecture, Yamanashi-prefecture, and Shizuoka-prefecture are included is updated to the latest-version map data. Only the Level 1 layer map data about the area 58 as Shizuoka-prefecture is in the earlier version.

In this situation, first, both the route around the present position and the route around the destination are searched based on the latest-version Level 1 layer route search data. In addition, as already described in the first embodiment with reference to FIG. 10, the route from the present position to the destination is searched based on the latest-version higher (Level 2) layer map data that covers the area including both the present position and the destination. Then, if the present position is within the area 57 as Aichi-prefecture as shown in FIG. 16(*b*), the searched route is superimposed onto the map drawn based on the latest-version lowest-layer map display data in the display control job 13. At this time, the route searched based on the latest-version route search data, which is located within the other areas excluding the area 57, is not superimposed on the map of the other areas drawn based on the earlier-version map display data.

Upon crossing the border between the area 57 and the area 58 as shown in FIG. 16(*c*), the route is re-searched by using the earlier-version route search data in the search job 12. When the present position completely enters the area 58, the re-searched route is superimposed onto the map which is drawn based on the earlier-version lowest-layer map display data in the display control job 13.

Subsequently, upon crossing the border between the area 58 and the area 59, the route is re-searched by using the latest-version route search data in the search job 12. Then, when the present position completely enters the area 59, such re-searched route is superimposed onto the map drawn based on the latest-version lowest-layer map display data in the display control job 13.

Thus, in the display control job 13 according to the fourth embodiment, when the operator is guided along the route searched based on the latest-version route search data, such searched route is displayed onto the map drawn using the latest-version lowest-layer map display data. By contrast, when the operator is guided along the route searched based on the earlier-version route search data, such searched route is displayed onto the map drawn using the earlier-version lowest-layer map display data.

Therefore, according to the fourth embodiment, the representation of both routes located within the area for which the map data update is designated and undesignated may be ensured even if there is a difference between the data-version of the designated area and the data-version of the undesignated area. This allows the two different areas to be displayed in the same scale on the map, and thereby the operator will not be bewildered at the sudden change of the map scale.

Next, a fifth embodiment according to the invention will be described. For convenience of explanation, the same compositions and operations according to the first, second, third, and fourth embodiment are not described here.

In the fifth embodiment, the route guidance along a route located within the area uncovered by the latest-version lowest-layer is visually given to the operator in simple form. As an example, the first scenario in the fourth embodiment will be used, wherein the destination is not within Aichi-prefecture covered by the latest-version lowest-layer map data. In a similar situation according to the fifth embodiment, on the screen in the display unit 35 the searched route between the present position to the destination may be simply displayed as a straight line in the display control job 13. In addition, on the same screen, a scaled-down map including the present position and destination may be drawn as a background to that straight line.

Furthermore, a straight line may be drawn between an end point of the route located within the area covered by the latest-version lowest-layer map data and the destination located out of the area. For example, according to the first scenario in the fourth embodiment as shown in FIG. 14(*a*), a route starting from the present position is displayed as a straight line as far as the route exists within the area 57. Then, a route between the end point of the straight line, i.e., a point on the border between the area 57 and the area 58 to the destination may be displayed in additional straight line. This additional straight line helps the operator to know a direction to the destination.

In scroll-display according to the present fifth embodiment, a route searched based on the route search data whose data version is the same as the map display data's may be displayed. In this case, as previously described in the fourth embodiment, the route may be re-searched in the search job 12 based on the map display data used in drawing the map on the screen. Then, in the display control job 13, such searched route is displayed on the map to be scrolled.

Additionally, in the display control job 13, it is possible to superimpose all routes from the present position to the destination at a time on single screen, i.e., on a scaled-down map, not onto the scaled-up map drawn based on the lowest-layer map display data. For example, the third scenario in the fourth embodiment will be considered, wherein a route may be searched based on the higher-layer map data when the present position and the destination are located apart from each other. In this situation according to the fifth embodiment, the map drawn based on the higher-layer map display data may be displayed on the screen on which the searched route may be further superimposed.

Thus, according to the fifth embodiment, the searched route may be displayed in a simple form and thereby simple route guidance along that searched route may be visually given to the operator. This simple route guidance contributes to the reduction of the data-processing workload on the navigation processing part 17 in the on-board device 14.

A sixth embodiment according to the invention will be described hereinafter. For convenience of explanation, the same compositions and operations according to the first, second, third, fourth, and fifth embodiment are not described here.

According to the first embodiment, when the present position or the destination is within the area covered by the latest-version lowest-layer map data, the route is searched based on such latest-version route search data. For example, in the third scenario of the first embodiment, only the lowest-layer (Level 1) map data about Aichi-prefecture as a designated area is in the latest-version, while the lowest-layer (Level 1) map data about Shizuoka-prefecture as an undesignated area is in the earlier-version. Therefore, if the destination is located within Shizuoka-prefecture, the route around the destination is searched based on only the map data stored in Level 2 block and not based on the map data stored in Level 1 block. With such operations, only a route that reaches a certain point located on the principal road, the certain point being closest to the destination, can be searched. In other words, a specific route that exactly reaches the destination is not searched.

To overcome this, the sixth embodiment provides some operations in which the operator may select the version of the map data used in the route search as well as in the route guidance. To select the map version, the operator operates the input unit 34 to determine a selection condition as follows: whether the latest-version map data which covers only the designated area deserves priority in the Level 1 layer, or whether the earlier-version map data which covers all of Japan deserves priority in the Level 1 layer.

For example, if the operator determines to assign high priority to the latest-version map data, the route is searched using the prioritized latest-version map data, as carried out in the first embodiment.

According to the first and second scenarios in the first embodiment, every route search data used in the search job 12 is contained in the latest-version map data about Aichi-prefecture. In this situation, every route from the present position to the destination is located within Aichi-prefecture, and as such, every route is based on the latest-version lowest (Level 1) layer map data. Therefore, in the display control job 13, the searched route is displayed onto the map drawn based on the latest-version map display data.

Similarly, according to the third scenario in the first embodiment, every route search data in the search job 12 is in the latest-version. However, in this case, Level 1 layer map data about other areas excluding Aichi-prefecture is not updated to the latest-version map data, and therefore the route is searched based on the latest-version map data in Level 2 layer.

As described in the first embodiment, it is impossible for the navigation apparatus to carry out the route guidance based on the respective map data that is different with respect to data versions. This is because the identifying number and identifying code given to a road and link are not common to respective map data that differ with respect to version. Therefore, in the display control job 13, the searched route can be superimposed onto the map which is drawn using the map display data in Level 1 layer as far as such searched route is located within Aichi-prefecture. However, in the case of the searched route being outside of Aichi-prefecture, the superimposition of the searched route onto the map drawn using the map display data in Level 1 layer is impossible.

For such a problematic case, the display control job 13 may offer an operation in which the searched route is superimposed onto the map drawn using the map display data in Level 2 even if the searched route is outside of Aichi-prefecture. In other words, in the display control job 13, the route being outside of the area which is covered by the latest-version lowest-layer map data may be superimposed onto the map drawn using the higher-layer map data, i.e., the route search data in the higher layer. Thereby, even if the version of the route search data used in the search job 12 is different from that of the map display data used in the display, the searched route may be displayed onto the screen and thereby the route guidance may be visually given to the operator.

If the operator assigns higher priority to the earlier-version map data in the search job 12, the route is searched in accordance with an ordinary search method employed in the conventional navigation apparatus. Thereby, the searched route can be superimposed onto the map which drawn based on the map display data in the earlier-version lowest (Level 1) layer. And thus, the route guidance is visually given to the operator.

As previously described, the operator can assign high priority to the earlier-version map in the route search. In such case, however, if all map data necessary for the route search is updated to, and remains as, the latest-version map data about Aichi-prefecture as described in the first and second situations in the first embodiment, it is desirable that the latest-version map data be used in the route search anyhow.

Thus, according to the sixth embodiment, the operator may select the map data version used for the route search and the route guidance. Therefore, even if the destination is outside of the area that is covered by the latest-version lowest-layer map data, the route to the destination may be searched based on the higher-layer map data and thereby the route guidance may be visually given to the operator.

Next, a seventh embodiment according to the invention will be described with reference to the following drawings. For convenience of explanation, the same compositions and operations according to the first, second, third, fourth, fifth, and sixth embodiment are not described here.

Figure 17:
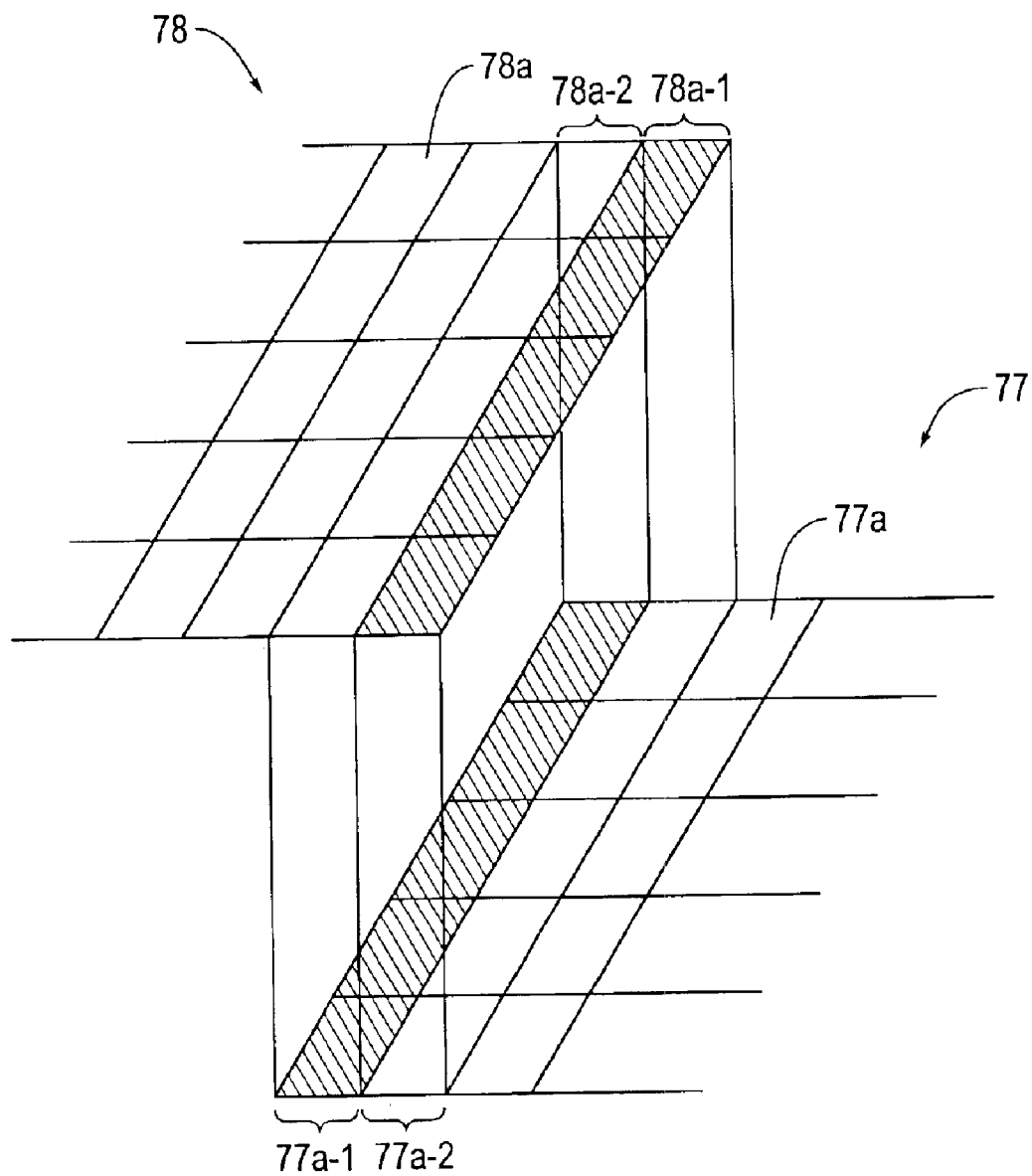
FIG. 17 explains a method of map data concatenation according to a seventh embodiment of the invention.
Figure 18:
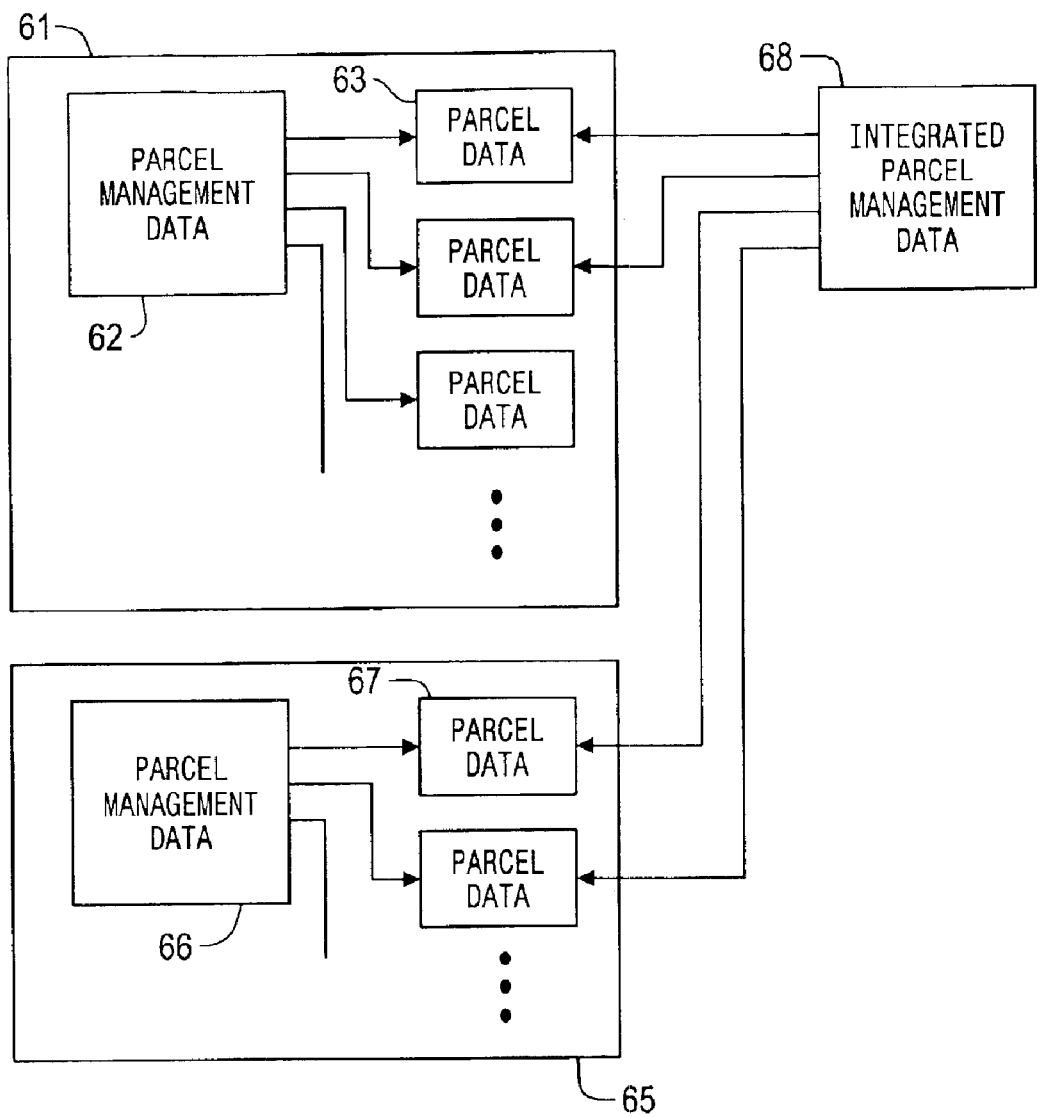
FIG. 18 schematically explains map data management according to a seventh embodiment of the invention.

FIG. 17 explains a method of map data connection according to a seventh embodiment of the invention. FIG. 18 schematically explains map data management according to a seventh embodiment of the invention.

According to the present seventh embodiment, the description describes a scenario where the map data is connected in accordance with the following operations: first, upload the latest-version map data into the data storage 16; then, update the map data about the designated area in the data storage 16 to the latest-version map data; subsequently, update the map data about the adjacent area to the designated area; lastly, connect the updated map data about the designated area with the updated map data about the adjacent area. Specifically, the description takes a situation where the map data about Aichi-prefecture is updated to the latest-version map data and thereupon the map data about Shizuoka prefecture, adjacent to Aichi-prefecture, is updated to the latest-version map data. Here, only the map data in Level 1 is described because the map data in Level 2 covers both areas simultaneously without having to connect the data.

In a data management job 42 (shown in FIG. 4), as shown in FIG. 17, the latest-version map data 78 about Shizuoka-prefecture, newly stored in the storage 16, is connected with the latest-version map data 77 about Aichi-prefecture, already stored in the storage 16. Here, both the map data 77 and the map data 78 are connected by connecting a column of parcels 77*a* to a column of parcels 78*a*. The parcels 77*a* and the parcels 78*a* cover a small part of Aichi-prefecture and a small part of Shizuoka-prefecture, respectively. Specifically, each parcel stores the data about the identifying number and the identifying code given to each road and each link, the identifying number and the identifying code are contained in the road data about the roads located within the small part area.

Each parcel stores open-ended connecting data by which adjacent parcels are freely connected with each other. Therefore, a road going through several small areas is represented by a plurality of parcels. In FIG. 17, both a column of parcels 77a-1 and a column of parcels 78a-1 (shaded portion) represent the boarder between Aichi-prefecture covered by the map data 77 and Shizuoka-prefecture covered by the map data 78. The open-ended connecting data stored in the parcels representing the border (i.e., the open-ended connecting data having no adjacent parcels to connect on the other side) is converted to close-ended connecting data so that the connecting data may be fixed in each parcel. Once the map data 77 and the map data 78 are connected with reference to the border, the connected border is locked and no other map data can be connected to the locked border any more. This is inconvenient when it is to be desired that other map data be additionally connected to the locked boarder.

To overcome this inconvenience, the latest-version map data about the designated area distributed from the data center 51 is designed so that its outermost two-column parcels may connectively overlap with other outermost two-column parcels in the latest-version map data about the adjacent area to the designated area. In the data management job 42, the map data 77 is concatenated with the map data 78 as show in FIG. 17; the column of the outermost parcels 77a-1 representing the border in the map data 77 is connectively overlapped with the column of the second outermost parcels 78a-2 in the map data 78 as well as the column of the outermost parcel 78a-1 representing the border in the map data 78 is connectively overlapped with the column of the second outermost parcels 77a-2 in the map data 77. Thereby, the map data 77 and the map data 78 are connected with each other. After overlapping, both the column of the outermost parcels 77a-1 and the 78a-1 on the border are locked and not used for the map data concatenation any more. However, both the column of the second outermost parcels 77a-2 and the 78a-2 still store the open-ended connecting data that remains unconverted. Therefore, such open-ended connecting data may work in each parcel to connect with other parcels.

In the data management job 42, every map data stored in the data storage 16 is managed on a parcel-by-parcel basis. In this case as shown in FIG. 18, the data storage 16 contains a post-update data management file 61 and a pre-update data management file 65. In a situation where the map data is updated over several times and therefore plural updated map data in several versions exist, the post-update data management file 61 may be split into several files in accordance with the several versions. Hereinafter, a situation is described where the map data is updated only one time and therefore only the one updated map data exists in one version.

The post-update data management file 61 comprises parcel data 63 about each parcel included in the updated map data and parcel management data 62 that manages each parcel data 63. Although FIG. 18 shows only three pieces of parcel data 63, actually a large number of parcel data 63 can exist in the file 61. The parcel management data 62 contains data about areas covered by each parcel data 63 as well as contains data about storage locations of the parcel data 63 in the post-update management file 61.

The pre-update data management file 65 comprises parcel data 67 about each parcel included in the pre-update map data and parcel management data 66 that manages each parcel data 67. The parcel management data 66 data about areas covered by each parcel data 67 as well as data about storage locations of the parcel data 67 in the pre-update management file 65.

The data storage 16 contains integrated parcel management data 68 to manage all parcel data. The integrated parcel management data 68 holds the following data: data about the areas respectively covered by the parcel data 63 and parcel data 67, data about the locations of the parcel data 63 in the post-update data management file 61, data about the locations of the parcel data 67 in the pre-update data management file 65, and data about the versions of the parcel data 63 and the parcel data 67. With these components, the data management job 42 offers parcel-by-parcel basis management of the map data, managing not only the updated map data but also the pre-update map data.

Thus, according to the seventh embodiment, in the data management job 42, the latest-version map data 77 (already stored in the storage 16) about a specified area is connected with the latest-version map data 78 about the adjacent area to the specified area. This enables the navigation apparatus to search a wide area for a route as well as to guide the operator along the searched route. The parcel-by-parcel basis management of the updated map data and the pre-update map data by the data management job 42 allows the on-board device 14 to carry out correct route search and guidance along the searched route.

As exemplified by the previous embodiment, according to the invention, map data may be updated on a specified area basis. This may shorten the time for updating the map data, lowering the cost of map data update.

The foregoing invention has been described in terms of preferred embodiments. However, those skilled in the art will recognize that many variations of such embodiments exist. Such variations are intended to be within the scope of the invention and the appended claims.

What is claimed is:

1. A method of operating a navigation system comprising:
determining a present position of a vehicle;
selecting an actual destination;
determining the location of the destination within stored map data;
determining, based an the stored map data, a route beginning at the present position and ending at the determined location of the destination;
communicating the route to a user of the navigation system, wherein the stored map data may be updated at the user's request in portions smaller than the whole of the stored map data, the stored map data has a layered structure in which the map data in a lowest-layer represents the smallest and most detailed portions while the map data in a higher-layer represents a less detailed, wider portion(s) that include(s) a smaller area represented by a lower-layer map data portion, and the map data may be periodically undated by a data center;
updating the stored map data for at least one data portion within at least one layer by receiving new data from the data center; and
connecting the updated at least one data portion within the at least one layer to the adjacent map data of that at least one layer that is of the same version, wherein the connected data may still be reconnected to another adjacent area.

2. The method of operating a navigation system of claim 1, wherein if the determined destination is determined based on the lowest-layer map data the determined destination is the actual destination.

3. The method of operating a navigation system of claim 1, wherein if the determined destination is determined based on a layer other than the lowest-layer map data, the determined destination is a destination on a road within that other than the lowest-layer map data closest to the actual destination.

4. The method of operating a navigation system of claim 3, wherein the route is communicated visually.

5. The method of operating a navigation system of claim 4, wherein the route is communicated audibly.

6. A method of communicating the route using a navigation system, comprising:
- determining a present position of a vehicle;
- selecting an actual destination;
- determining the location of the destination within stored map data;
- determining, based on the stored map data, a route beginning at the present position and ending at the determined location of the destination;
- communicating the route to a user of the navigation system, wherein the stored map data may be updated at the user's request in portions smaller than the whole of the stored map data, the stored map data having a layered structure in which the map data in a lowest-layer represents the smallest and most detailed portions while the map data in a higher-layer represents a less detailed, wider portion(s) that include(s) a smaller area represented by a lower-layer map data portion;
- determining whether the present position is within a latest-version of a lowest-layer stored map data portion;
- determining whether the actual destination is within a latest-version of a lowest-layer stored map data portion;
- determining whether at least one of the higher-layers containing the present position is within a latest-version of the stored map data;
- determining whether at least one of the higher-layers containing the actual destination is within a latest-version of the stored map data;
- communication, if the present position is within the latest-version of a lowest-layer stored map data portion, as much of the route that may be communicated based on that latest-version of the lowest-layer stored map data portion; or
- communicating, if the present position is not within the latest-version of the lowest-layer stored map data portion, as much of the route that would have been within the latest-version of the lowest-layer stored map data portion based on a higher-layer that is of the latest version and contains the present position;
- communicating, if the actual destination is within the latest-version of a lowest-layer stored map data portion, as much of the route that may be communicated based on that latest-version of that lowest-layer stored map data portion; or
- communicating, if the actual destination is not within the latest-version of a lowest-layer stored map data portion, as much of the route that would have been within that latest-version of that lowest-layer stored map data portion based on a higher-layer that is of the latest version and contains the determined destination; and
- communicating as much of the determined route that traverses stored map data portions containing neither the present position nor the actual destination, by using the lowest of the layered portions which the route traverses that are of the latest-version.

7. A method of communicating the route using a navigation system, comprising:
- determining a present position of a vehicle;
- selecting an actual destination;
- determining the location of the destination within stored map data;
- determining, based on the stored map data, a route beginning at the present position and ending at the determined location of the destination;
- communicating the route to a user of the navigation system, wherein the stored map data may be updated at the user's request in portions smaller than the whole of the stored map data, the stored map data having a layered structure in which the map data in a lowest-layer represents the smallest and most detailed portions while the map data in a higher-layer represents a less detailed, wider portion(s) that include(s) a smaller area represented by a lower-layer map data portion;
- determining whether the present position is within a latest-version of a lowest-layer stored map data portion;
- determining whether the actual destination is within a latest-version of a lowest-layer stored map data portion;
- determining whether at least one of the higher-layers containing the present position is within a latest-version of the stored map data;
- determining whether at least one of the higher-layers containing the actual destination is within a latest-version of the stored map data;
- determining and communicating, if the present position is within the latest-version of a lowest-layer stored map data portion, as much of the route that may be communicated based on that latest-version of that lowest-layer stored map data portion; or
- determining and communicating, if the present position is not within the latest-version of a lowest-layer stored map data portion, as much of the route that may be communicated based on a lower-layer stored map data portion which contains the present position and is not of the latest-version;
- communicating, if the actual destination is within the latest-version of a lowest-layer stored map data portion, as much of the route that may be communicated based on that latest-version of that lowest-layer stored map data portion; or
- determining and communicating, if the actual destination is not within the latest-version of a lowest-layer stored map data portion, as much of the route that may be communicated based on a lower-layer stored map data portion which contains the actual destination and is not of the latest-version; and
- communicating as much of the determined route that traverses stored map data portions containing neither the present position nor the actual destination, by using a lower-layer portion which the route traverses regardless of that portions version, wherein whenever the determined route crosses a boarder between lower-layer stored map data portions that are of differing versions, the route must be re-determined and re-communicated according to the version of the lowest-layer map data portion that was crossed into.

8. The method of communicating the route of claim 7, wherein lowest-layer stored map data portions of different versions are communicated such that the data communicated from a lowest-layer map data portion of one version is distinguishable from a lowest-layer map data portion of another version.

9. A method of communicating the route using a navigation system, comprising:
- determining a present position of a vehicle;
- selecting an actual destination;
- determining the location of the destination within stored map data;

determining, based on the stored map data, a route beginning at the present position and ending at the determined location of the destination;

communicating the route to a user of the navigation system, wherein the stored map data may be updated at the user's request in portions smaller than the whole of the stored map data, the stored map data having a layered structure in which the map data in a lowest-layer represents the smallest and most detailed portions while the map data in a higher-layer represents a less detailed, wider portion(s) that include(s) a smaller area represented by a lower-layer map data portion;

determining and communicating, if each lowest-level map data portion necessary to determine a route from the present position to the actual destination is of the latest-version, the route using those latest-version lowest-level map data portions; or allowing a user to select, if each lowest-level map data portion necessary to determine a route from the present position to the actual destination not of the latest version, a version of map data portions that will be used to determine and communicate the route, wherein if a map data portion of that version does not exist for a portion of the determined route a most-recent stored map data portion will be used for that non-existent portion and whenever the determined route crosses a boarder between stored map data portions that are of differing versions, the route must be re-determined and re-communicated according to the version of the map data portion that was crossed into.

10. The method of communicating the route of claim 9, wherein lowest-layer stored map data portions of different versions are communicated such that the data communicated from a lowest-layer map data portion of one version is distinguishable from a lowest-layer map data portion of another version.

* * * * *